US011290538B2

(12) United States Patent
Chau et al.

(10) Patent No.: US 11,290,538 B2
(45) Date of Patent: Mar. 29, 2022

(54) POLICY-BASED PROGRAMMABLE INTERNET OF THINGS DEVICES

(71) Applicants:AT&T Mobility II LLC, Atlanta, GA (US); AT&T Global Network Services Hong Kong LTD, Island East (HK)

(72) Inventors: Winnie Chau, Hong Kong (HK); John Philip Mulligan, Island South (HK); Shashi Gowda, Lantau Island (HK)

(73) Assignees: AT&T Global Network Services Hong Kong LTD, Island East (HK); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 16/663,431

(22) Filed: Oct. 25, 2019

(65) Prior Publication Data

US 2021/0126974 A1    Apr. 29, 2021

(51) Int. Cl.
*H04L 29/08* (2006.01)
*H04L 12/24* (2006.01)
*H04L 67/125* (2022.01)
*H04L 41/14* (2022.01)

(52) U.S. Cl.
CPC .......... *H04L 67/125* (2013.01); *H04L 41/145* (2013.01)

(58) Field of Classification Search
CPC .......................... H04L 67/125; H04L 41/145
USPC ........................................................ 709/224
See application file for complete search history.

(56) References Cited

U.S. PATENT DOCUMENTS

| 2016/0088633 | A1* | 3/2016 | Egner | H04W 28/26 |
| | | | | 455/452.2 |
| 2018/0208448 | A1* | 7/2018 | Zimmerman | H04W 4/70 |
| 2018/0210522 | A1* | 7/2018 | Jain | G06F 1/3206 |
| 2018/0302440 | A1* | 10/2018 | Hu | H04L 63/20 |
| 2019/0068714 | A1* | 2/2019 | Flammer, III | H04L 69/08 |
| 2019/0182122 | A1* | 6/2019 | Kushnir | G06N 20/00 |
| 2019/0297113 | A1* | 9/2019 | Yang | H04L 47/20 |
| 2020/0007420 | A1* | 1/2020 | Shemer | H04L 67/125 |
| 2020/0177485 | A1* | 6/2020 | Shurtleff | H04L 43/0876 |

* cited by examiner

*Primary Examiner* — Mahran Y Abu Roumi
(74) *Attorney, Agent, or Firm* — Hartman & Citrin LLC

(57) ABSTRACT

The concepts and technologies disclosed herein are directed to policy-based programmable Internet of Things ("IoT") devices. An apparatus, for example, can include a device that includes an interface through which the device is to be connected to an asset. The asset can include one or more asset sensors. The device can include one or more device sensors, a network module, and a controller that executes instructions that cause the device to perform operations. In particular, the controller can execute instructions to cause the device to receive a device policy that instructs the device to collect device data from the device sensor(s) in accordance with a device ruleset. The device also can receive an asset policy that instructs the device to collect asset data from the asset sensor(s) in accordance with an asset ruleset. The device can collect the device data and the asset data in accordance with the device/asset policies.

18 Claims, 14 Drawing Sheets

| Sensors 402 | Scrap Cargo 404 | General Cargo 406 | Food Cargo 408 | Flexitank Cargo 410 | Hazardous Cargo 412 |
|---|---|---|---|---|---|
| Temperature & Humidity | | ✓ | ✓ | ✓ | ✓ |
| Door Open/Close | ✓ | ✓ | ✓ | ✓ | ✓ |
| Motion & Shock | ✓ | ✓ | ✓ | ✓ | ✓ |
| Humidity | | | | | ✓ |
| Chemical Detection (I) | | | ✓ | | ✓ |
| Pollutant | | | ✓ | | ✓ |
| Chemical Detection (II) | | | | | ✓ |

*FIG. 4*

| FIELDS 502 | | TAGS 504 | VALUES 506 |
|---|---|---|---|
| GLOBAL DEVICE TIMER 508 | | 0x01 | SECONDS |
| SENSOR-ID₁ 512A | | 0x100 – 0xFFF | N/A |
| SENSOR POLICIES₁ 514A | LOWER THRESHOLD | 0x01 | UNIT MINIMUM |
| | UPPER THRESHOLD | 0x02 | UNIT MAXIMUM |
| | SENSOR VALUE | 0x03 | HARD VALUE |
| | ON-CHANGE | 0x04 | BOOLEAN |
| | ACCURACY | 0x05 | ERROR MARGIN |
| | ON-CHANGE TIMER | 0x06 | SECONDS |
| SENSOR-ID₂ 512B | | 0x100 – 0xFFF | N/A |
| SENSOR POLICIES₂ 514B | | | |
| SENSOR-ID_N 512N | | 0x100 – 0xFFF | N/A |
| SENSOR POLICIES_N 514N | | | |

500

SENSOR₁ 510A
SENSOR₂ 510B
SENSOR_N 510N

*FIG. 5*

| Example 1 | Ruleset | | |
|---|---|---|---|
| Temperature | Rule Type | Rule Name | Rule Value | Rule Description |
| | 0x03 | On-Change | TRUE | If Temperature value changes by ± 2 degree celsius, then send notification to the platform |
| | 0x05 | Accuracy | 2 degrees Celsius | |

| Example 2 | Ruleset | | |
|---|---|---|---|
| Temperature | Rule Type | Rule Name | Rule Value | Rule Description |
| | 0x03 | On-Change | TRUE | If Temperature value changes by ± 2 degree celsius for more than 60 seconds, then send notification to the platform |
| | 0x05 | Accuracy | 2 degrees Celsius | |
| | 0x06 | Timer | 60 seconds | |

| Example 3 | Ruleset | | |
|---|---|---|---|
| Temperature | Rule Type | Rule Name | Rule Value | Rule Description |
| | 0x01 | Lower Threshold | 5 degrees Celsius | If Temperature is lower than 5 degrees celsius ± 1 degree celsius, or is higher than 40 degrees celsius ± 1 degree celsius, for more than 30 seconds, then send notification to the platform |
| | 0x02 | Upper Threshold | 40 degrees Celsius | |
| | 0x05 | Accuracy | 1 degree Celsius | |
| | 0x06 | Timer | 30 seconds | |

| Example 4 | Ruleset | | |
|---|---|---|---|
| Refresh Timer | Rule Type | Rule Name | Rule Value | Rule Description |
| | 0x06 | Timer | 60 seconds | The Global refresh timer for the device is 60 seconds |
| Cell-ID | Rule Type | Rule Name | Rule Value | Rule Description |
| | 0x04 | On-Change | TRUE | Since this is on-change, *Ignore GLOBAL timer*, and query NM every 15 seconds and report whenever there is a Cell-ID change. |
| | 0x07 | OCT1 | 15 seconds | |

*FIG. 6*

POLICY-BASED PROGRAMMABLE INTERNET OF THINGS DEVICES

BACKGROUND

Standard Internet of Things ("IoT") devices are typically designed with sensors as a single working unit, often tightly coupled during the engineering process. This includes the choice of specific sensors with a predetermined component level integration in mind as well as overall device application and operation. This integration makes any level of sensor separation impractical from both an engineering as well as a commercial perspective. Any sensor modification often can involve not only the redesign from a hardware, software, and quality process, but also new certification, fabrication, and production processes. This results in IoT devices that are either highly specialized or overly generic, forcing a high cost of solution ownership and often unachievable return on investment ("ROI"). Some device manufacturers do support limited sensor choice, but the range is strictly bounded and not flexible because of the device's overall tight integration with a business analytics framework.

SUMMARY

Concepts and technologies disclosed herein are directed to aspects of policy-based programmable IoT devices. According to one aspect of the concepts and technologies disclosed herein, an apparatus can include a device that, in turn, includes an interface through which the device is to be connected to one or more assets. Each asset can include one or more asset sensors. The device also can include a device sensor, a network module, and a controller that executes instructions that cause the device to perform operations. For example, the device can receive a device policy that instructs the device to collect device data from the device sensor in accordance with a device ruleset. The device can collect, via the device sensors, the device data in accordance with the device ruleset.

In some embodiments, the device can be uniquely identified by a device identifier. The device can register the device with a registration server using at least the device identifier. This registration process may additionally utilize unique identifiers associated with the network module ("NM") and a subscriber identity module ("SIM"). The registration server can be provisioned with these credentials and also store these credentials in a device database.

In some embodiments, the asset can include a sensor hub that is uniquely identified by an asset identifier. The device can register a combination of the device and the asset with the registration server using at least the device identifier and the asset identifier. The registration server can be provisioned with these credentials and also store these credentials separately in a device database and an asset database.

In some embodiments, the device also can receive an asset policy that instructs the device to collect asset data from the asset sensor in accordance with an asset ruleset. In some embodiments, the device can determine whether the device data conforms to the device policy and whether the asset data conforms to the asset policy.

In some embodiments, in response to determining that the device data does not conform to the device policy, an analytics system can flag a device policy violation of the device policy. Similarly, the analytic system, in response to determining that the asset data does not conform to the asset policy, can flag an asset policy violation of the asset policy. Alternatively, in response to determining that the device data does conform to the device policy, the analytics system can record the device data. Also, in response to determining that the asset data does conform to the asset policy, the analytics system can record the asset data.

In some embodiments, the device policy is an operator-driven policy. In other embodiments, the device policy is an event-driven policy. In some embodiments, the asset policy is an operator-driven policy. In other embodiments, the asset policy is an event-driven policy. For operator-driven policies, the device can record actual device data values and/or actual asset data values. For event-driven policies, the device can record inferred device data values and/or inferred asset data values.

According to another aspect disclosed herein, an analytics system can select an active device. The active device can be, in some embodiments, a standalone device, or in other embodiments, a combination of a device and an asset. The device and the asset can each include one or more sensors. The analytics system can query a policy database for an event-driven policy to which the active device is subject. In response to receiving the event-driven policy as a result of the querying, the analytics system can create a new operator-driven policy for the active device. The analytics system can then convert the event-driven policy to the new operator-driven policy.

In some embodiments, the analytics system can receive data collected by the device sensor, the asset sensor, or both the device sensor and the asset sensor. The analytics system can determine whether the data is in violation of the new-operator driven policy. If the data is not in violation of the new operator-driven policy, the analytics system can revert the new operator-driven policy back to the event-driven policy.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIG. 4 is a table diagram illustrating different combinations of sensors for different types of dry container assets, according to an illustrative embodiment.

FIG. 5 is a table diagram illustrating aspects of an example policy-based protocol for dynamic sensor combinations, according to an illustrative embodiment.

FIG. 6 is a table diagram illustrating aspects of example rulesets that can be used to manage device or device+asset functions, according to an illustrative embodiment.

DETAILED DESCRIPTION

Figure 1A:
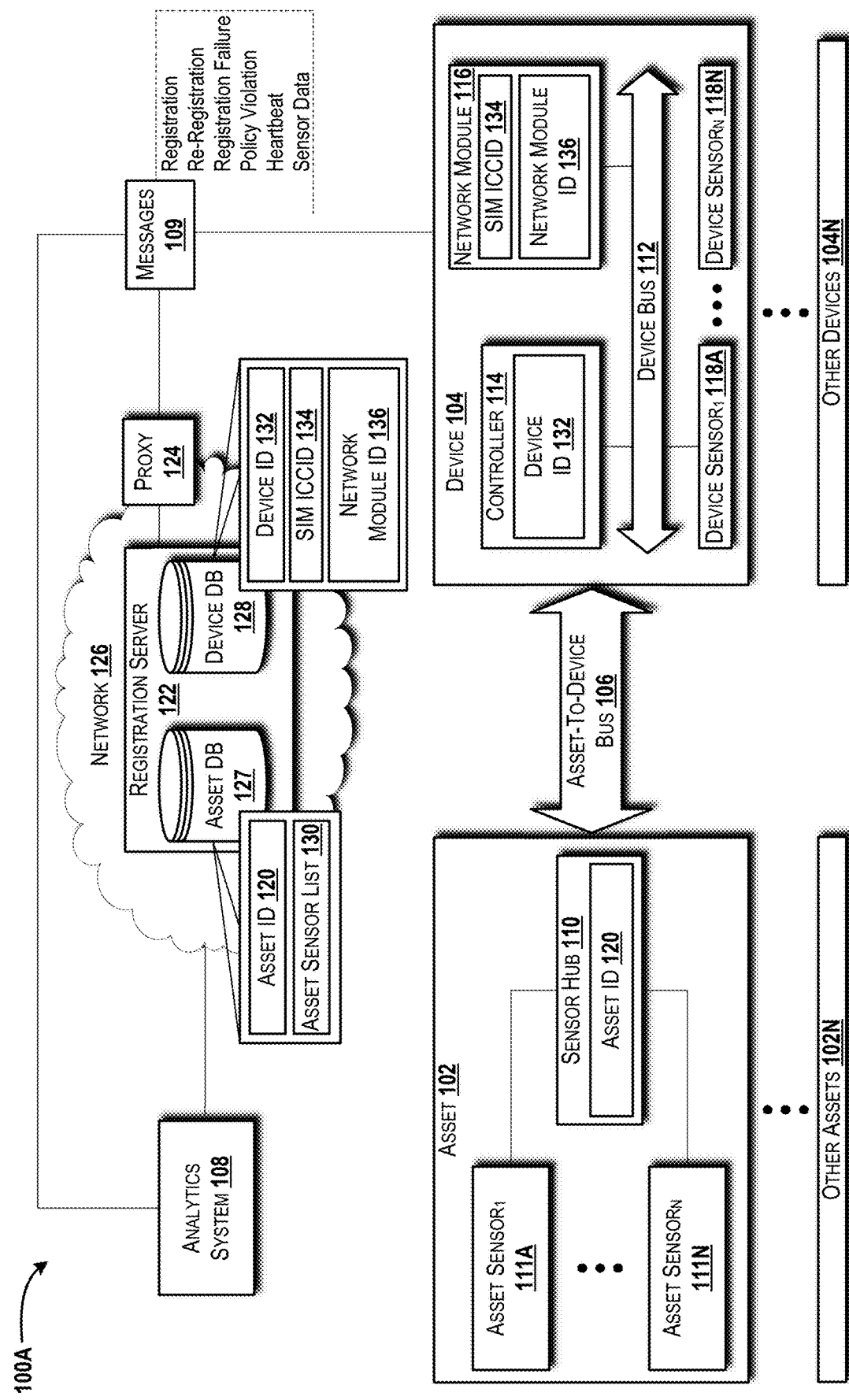
FIGS. 1A-1C are block diagrams illustrating aspects of an illustrative operating environment in different configurations and in which various concepts and technologies disclosed herein can be implemented.

Standard IoT devices are typically designed with sensors as a single working unit, often tightly coupled through the engineering process. This includes the choice of specific sensors with a predetermined component level integration in mind as well as overall device application and operation. This tight coupling makes any level of sensor separation impractical from both an engineering as well as a commercial perspective. Any sensor modification can often involve not only the redesign from a hardware, software and quality process but also new certification, fabrication and production. This results in IoT devices that are either highly specialized or overly generic, forcing a high cost of solution ownership and often unachievable ROI. Some device manufacturers do support limited sensor choice, but the range is strictly bounded and not flexible because of the device's overall tight integration with a business analytics framework. The concepts and technologies disclosed herein allow devices using a new protocol framework to be seamlessly integrated with any analytics framework. Because of this separation, the approach described herein allows for more device, sensor, and IoT asset flexibility than existing market solutions.

The concepts and technologies disclosed herein provide a hardware and software framework for allowing IoT sensors to be hot-swappable with IoT devices and for IoT devices to be hot-swappable with IoT assets being monitored and/or tracked. This allows for pre-certified IoT devices to support a larger number of use cases across different business verticals, thus reducing the cost of solution ownership and allowing a smoother transition from a proof of concept ("PoC") solution to an operational solution. IoT solutions are often highly specialized for specific industrial or commercial use cases. Any deviation from the use case often requires comprehensive redesign, introducing significant risk to ROI achievability. The concepts and technologies disclosed herein allow for flexible streamlined PoC to operational solution transition.

The concepts and technologies disclosed herein provide end users, device and sensor manufacturers, and systems integrators with n-number of sensor combinations that can be supported from a single pre-certified IoT device. This level of sensor and asset flexibility, however, introduces operational and solution complexity when it comes to the security and policy enforcement required for the many different use cases supported by the solution disclosed herein. In order to solve this problem, the concepts and technologies disclosed herein provide a policy management framework to support the secure and operational management of devices with multiple sensor combinations. The policy management of these generic, or "whitebox," devices allows programmability of which sensors should be active and under which specific environmental conditions or events. This provides solution integrators tremendous control and flexibility in overall implementation and operations. Whitebox programmability provides tremendous flexibility, but introduces challenges for business intelligence platforms because of the dynamic and unpredictable nature of when specific data will arrive depending on which policies have been sent to the device. In order to solve this problem, the concepts and technologies disclosed herein include a framework for inferred data analytics ("IDA"). The IDA framework allows for IoT data that is not sent by the device (e.g., due to programmed policies) and that is not received by the platform to be processed as "actual" data by any business intelligence or analytics platform.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1B:
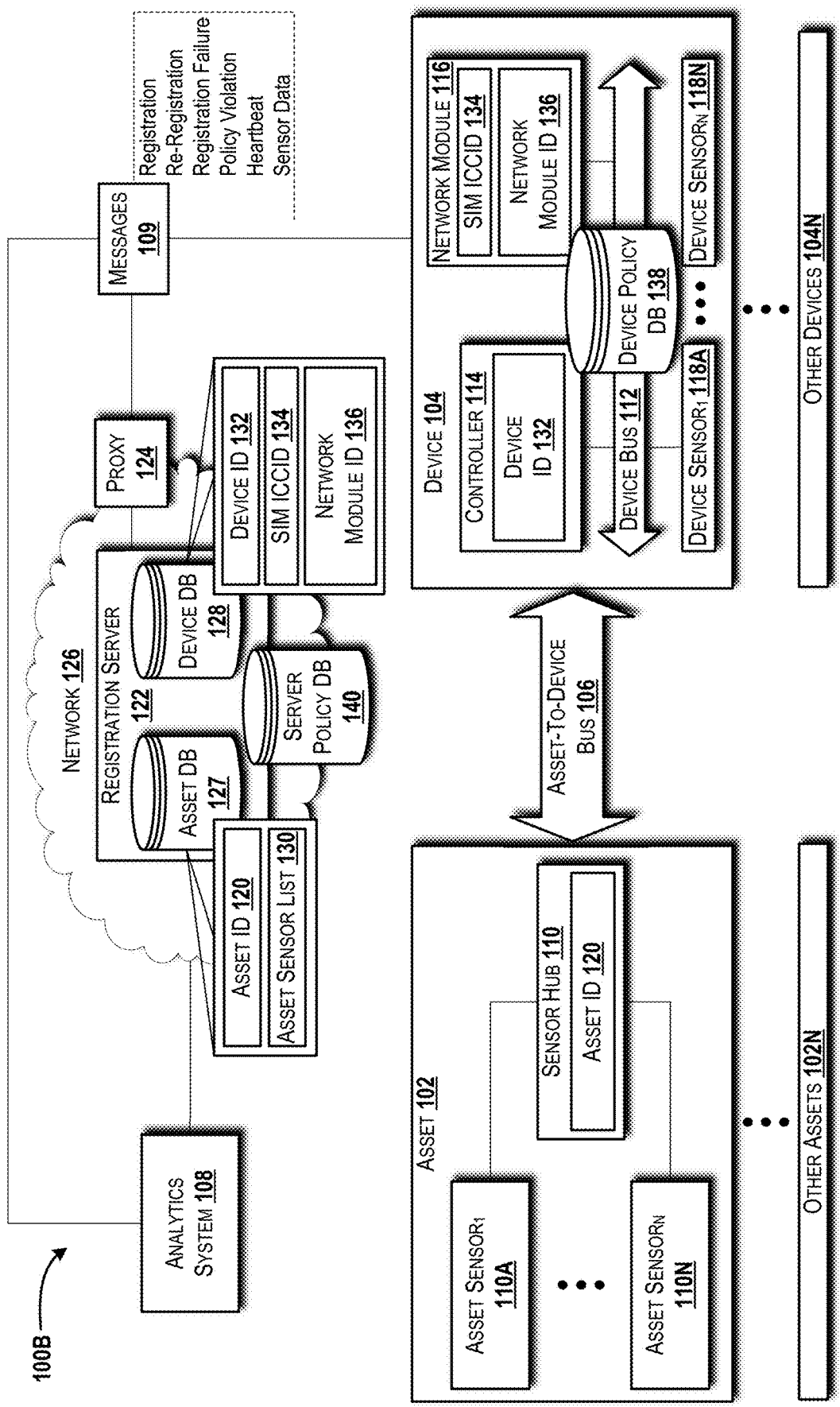
Figure 1C:
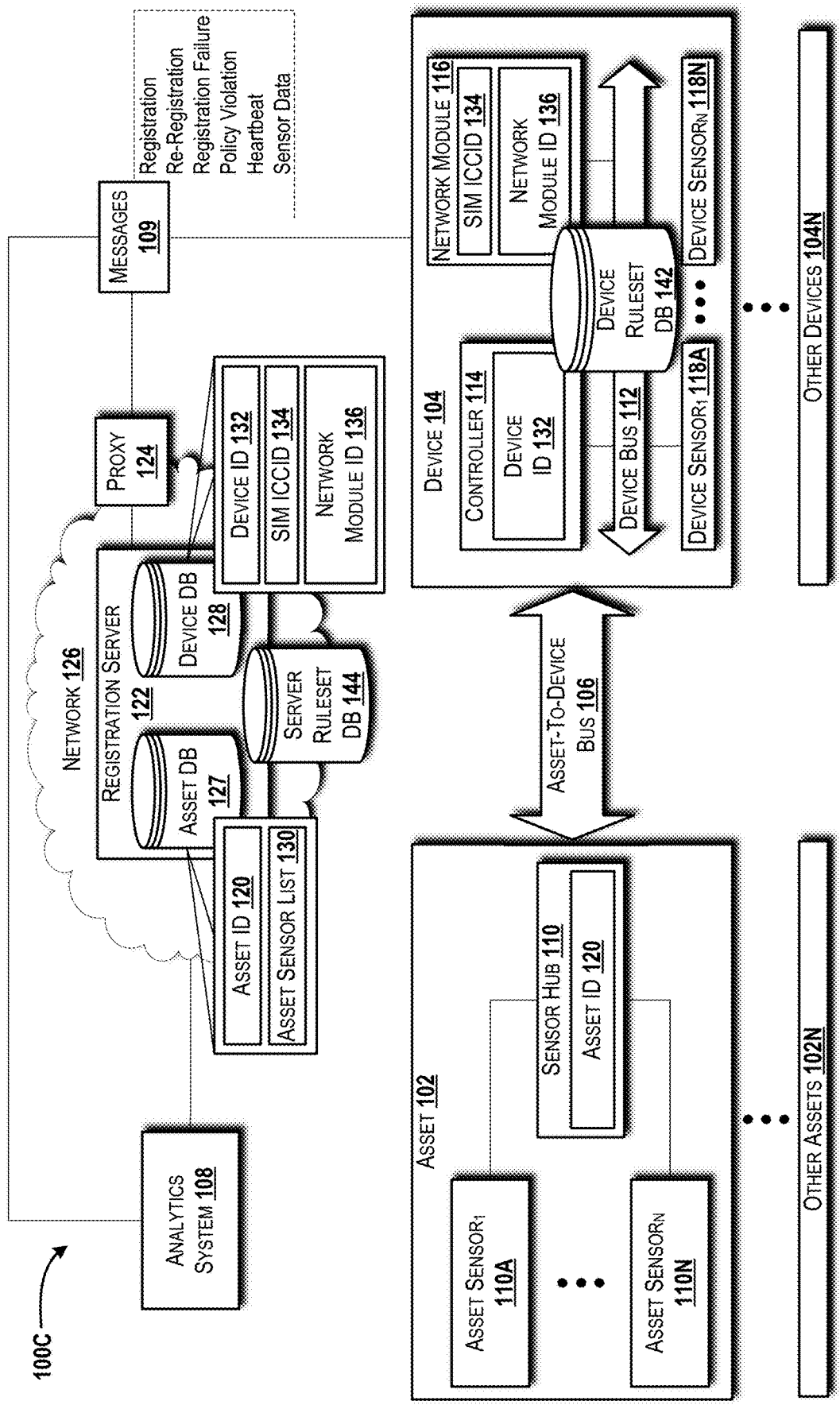

Turning now to FIGS. 1A-1C, an illustrative operating environment 100A-100C in which various concepts and technologies disclosed herein can be implemented will be described. The operating environment 100A-100C shows different aspects of the same operating environment. As such, the components shown in the operating environment 100A of FIG. 1A can be implemented together with the components shown in the operating environment 100B of FIG. 1B and/or the operating environment 100C of FIG. 1C.

The operating environment 100A shown in FIG. 1A can include any real-world asset ("asset") 102. The embodiments described herein focus on a single asset 102. It should be understood, however, that the asset 102 may be one asset among a plurality of other assets 102N. The asset 102 can be any "thing" that is to be tracked and/or monitored. The asset 102 is flexible and can support n-number of sensor combinations to monitor one or more parameters associated with the asset 102.

The concepts and technologies disclosed herein find particular application to logistics scenarios, such as product tracking throughout a supply chain. For this reason, the asset 102 will be described herein, at times, in the context of a dry shipping container, such as used to transport products in bulk over long distance (e.g., by sea), but those skilled in the art will appreciate the applicability of the concepts and technologies disclosed herein to other assets to be tracked and/or monitored. Some exemplary examples of the asset 102 include, but are not limited to, a product or good, a box that contains one or more products/goods, a cargo box that contains one or more products/goods, a pallet that contains one or more cargo boxes, or a container that contains at least one pallet. The type of assets 102 that can be monitored in accordance with the concepts and technologies disclosed herein should not be limited in any way. Moreover, the industries to which the concepts and technologies disclosed herein may be applied should not be limited in any way.

The asset 102 is in communication with a programmable IoT device (referred to herein for simplicity as "device") 104 via an asset-to-device bus 106. The embodiments described herein focus on a single device 104. It should be understood, however, that the device 104 may be one device among a plurality of other devices 104N. The device 104 is flexible and can support n-number of sensor combinations to monitor one or more parameters associated with the asset 102.

The parameter(s) to be monitored can be any parameter of the asset 102 and/or the device 104 that is/are capable of being monitored by one or more sensors. The sensors can be off-the-shelf sensors or custom sensors built to monitor a specific one or more parameters associated with the asset 102. As such, the concepts and technologies disclosed herein are not limited to any particular set of parameters to be monitored. By way of example, however, the parameters can be environmental parameters such as temperature or humidity of the asset 102; security parameters such as door open/close events; or geographical/location parameters such as latitude and longitude coordinates.

The device 104 can be dynamically reprogrammed upon registration or login after registration based upon one or more policies stored in a policy database (introduced below in FIG. 1B as device-side policy database 138/server-side policy database 140). The device 104 can be reprogrammed during runtime based upon one or more operator-driven policies. Alternatively, or additionally, the device 104 can be reprogrammed during runtime, based upon one or more event-driven policies. Each policy can include one or more rules, which may be combined into one or more rulesets. An example framework for the policies disclosed herein is illustrated and described herein with reference to FIG. 5. Several example rulesets are illustrated and described with reference to FIG. 6.

Turning briefly to FIG. 6, a table 600 is shown illustrating several example rulesets for different types of sensors. Example 1 shows a first ruleset for a temperature sensor with two rules. One rule (identified as Rule Type 0x03; Rule Name On-Change) states that if temperature changes, send a notification. Another rule (identified as Rule Type 0x05; Rule Name Accuracy) states that the sensor accuracy is 2 degrees Celsius. The first "temperature" ruleset is equal to rule 0x03 plus rule 0x05. In other words, the first ruleset is specific to a temperature sensor and is the combination of rules associated with that temperature sensor. A device policy is the combination of all sensor rulesets—for example, a temperature ruleset plus a humidity ruleset plus a door open/close ruleset, or other combination as the case may be.

Two policy types are described herein—an event-driven and an operator-driven policy. These policies differ in how the data collection process is dictated. The example described above is an example of an event-driven policy. Example 1 shows two rules in a temperature ruleset. If this is the only ruleset, then these two rules encompass the entirety of a device policy. The device policy is event-driven because an event, such as a change in temperature detected by a temperature sensor, causes the device 104 to send a notification. In other words, the device 104 will only send data when the policy (again the one ruleset in this example) is violated. A violation of this policy would be a temperature change (i.e., rule 0x03) that exceeds plus or minus 2 degrees Celsius (i.e., rule 0x05).

Event-driven policies for white-box programmability create gaps in time-series analytics platforms. Turning back to FIG. 1A, an analytics system 108 is shown. The analytics system 108 allows for policy-based inference of data sets and data ranges via dynamic, sensor-specific reporting time intervals, sensor thresholds, and sensor-based margins of error. The analytics system 108 allows for secure verification of policy integrity. The analytics system 108 allows for secure verification of device health and operation. The analytics system 108 allows for intelligent detection of intrusion through the device 104 and/or its associated sensors (described below). The analytics system 108 provides secure and verifiable policy-driven inferred data sets and ranges for the device 104 with support for n-number of sensor combinations.

Time-series analytics solutions often depend on repeated readings (i.e., sensor output) from assets such as the asset 102. For example, a time-series solution might cause a temperature sensor to take a reading every X minutes. The analytics system 108, in this case, would expect a periodic data event and perform analytics on the data received during each periodic data event. In the example device policy described above, the device 104 will only send data when the policy has been violated—again, a temperature change (i.e., rule 0x03) that exceeds plus or minus 2 degrees Celsius (i.e., rule 0x05). For implementations in which the analytics system 108 uses time-series analytics, this can confuse the analytics system 108 because the rate of incoming data is unpredictable.

The concepts and technologies disclosed herein implement heartbeat messages as part of various messages 109 that can include other message types such as registration, re-registration, registration failure, policy violation, and sensor data, as will be described herein. A heartbeat message notifies the recipient that the device 104 is still working even if sensor data has not been sent. This is still in compliance with the device policy because the heartbeat message does not contain any temperature data. When the device policy is violated, however, the heartbeat message or a separate data message can include the temperature data that corresponds to the policy violation.

A heartbeat message can be used by the analytics system 108 (time-series) to infer, based on policy, the temperature data without actually having received it. This is because the heartbeat message indicates that the device is working properly and is not in violation of the device policy. The analytics system 108 knows from the policy that the temperature is Y because the temperature has not changed plus or minus 2 degrees Celsius. In this manner, the gaps in a time-series analytics platform are filled with a steady, periodic stream of temperature data.

An operator-driven policy is the opposite of an event-driven policy. In light of the above example, an example operator-driven policy might be "Give me a temperature reading every 5 minutes." This is the normal way that many IoT devices operate. In other words, the "operator" (i.e., the entity responsible for the analytics platform) is dictating the data collection process. Under an operator-driven policy, the goal is to take any intelligence out of the device 104 and instruct the device 104 to simply report sensor readings.

The asset-to-device bus 106 can enable bi-directional communication between the asset 102 and the device 104. More particularly, the device 104 can communicate with a sensor hub 110 of the asset 102 to obtain sensor data from any number of asset sensors 111A-111N (hereinafter referred to individually as "asset sensor 111," or collectively as "asset sensors 111"). The asset sensors 111A-111N can be associated with the asset 102 (e.g., installed, attached, or otherwise implemented) so as to monitor different aspects of the asset 102. The asset sensor(s) 111, in some embodiments, is/are associated with the asset 102 as the asset 102 moves through the supply chain, such as, for example, from manufacturing (or harvesting, mining, or other method of creation or procurement) to warehousing to fleet/shipping and finally to retail or another link in the supply chain. In this manner, the asset sensors 111 can include sensors that monitor/track data that is common among the different verticals in the supply chain. For example, the asset sensors 111 may include a temperature sensor and/or humidity sensor configured to measure the temperature and/or humidity of the asset 102 itself or an environment in which the asset 102 is located.

The asset-to-device bus 106 can be or can include any interface over which data can be shared between the sensor hub 110 and the device 104. The asset-to-device bus 106, in some embodiments, also can provide power to the sensor hub 110 in sufficient capacity to enable operation of the asset sensors 111. Although a power supply is not illustrated, AC and DC power supplies are contemplated, including mains and battery-based implementations. The asset-to-device bus 106 can be implemented as a wired, wireless, or combined wired/wireless interface. The asset-to-device bus 106 can utilize any standardized interface such as, but no limited to, serial bus, universal serial bus ("USB"), serial ATA ("SATA"), eSATA, BLUETOOTH, IEEE 1394 ("FIRE-WIRE"), serial peripheral interface ("SPI"), inter-integrated circuit ("I2C"), WIFI, combinations thereof, and the like. The asset-to-device bus 106 alternatively can utilize a proprietary interface.

The asset-to-device bus 106 can be an extension of a device bus 112 associated with the device 104. The device bus 112 can enable communication between components of the device 104, including a controller 114, a network module (also referred to herein as "NM") 116, and any number of device sensors 118A-118N (hereinafter referred to individually as "device sensor 118," or collectively as "device sensors 118"), and with the sensor hub 110 that terminates the asset-to-device bus 106. This allows sensors external to the device 104, such as the asset sensors 111 connected to the sensor hub 110, to be viewed by the device 104, and more specifically, the controller 114 of the device 104, as internal sensors similar to the device sensors 118. In this manner, the device 104 can provide additional monitoring/tracking functionality to the asset 102. Moreover, as noted above, the asset sensors 111 can be powered by the device 104 similar to the device sensors 118 and other components of the device 104.

The sensor hub 110 is extensible so that n-number of sensors can be attached externally to the device 104. The sensor hub 110 can be associated with an electronic identifier (shown as "asset ID 120"). The asset ID 120 is a unique identifier to uniquely identify the asset 102 among a plurality of other assets 102N. The format of the asset ID 120 can include any combination of letters, numbers, symbols, and/or other characters. The asset ID 120 can be in a standardized format or a proprietary format. The asset 102 can be registered, by the device 104, with a registration server 122. The device 104 can send, via the network module 116, the asset ID 120 to the registration server 122 directly, or by way of a proxy 124 between the device 104 and a network 126 as shown in the illustrated example. The registration server 122 can store the asset ID 120 in an asset database (shown as "asset DB") 127. The registration server 122 also provides secure, independent registration of devices, such as the device 104, in a device database (shown as "device DB") 128. Device-only and device plus asset (referred to herein, at times, as "device+asset 104/102") registration will be described herein below with reference to FIGS. 2 and 3, respectively. The asset database 127 also can store an asset sensor list 130 that includes information about the asset sensor(s) 111. In particular, the asset sensor list 130 can identify the type of sensor, brand of sensor, version of sensor, and/or other information that can be used to determine the monitoring/tracking capabilities of the asset 102 based upon the asset sensors 111.

The asset sensors 111 and the device sensors 118 can be any sensor types. By way of example, and not limitation, the asset sensors 111 and the device sensors 118 can be or can include acceleration sensors, acoustic sensors, advanced sensors, alkalinity sensors, ambient sensors, angle sensors, auditory sensors, automation sensors, automotive sensors, barometric sensors, bio sensors, chemical sensors, control sensors, density sensors, depth sensors, directional sensors, displacement sensors, distance sensors, door sensors, electric current sensors, electric potential sensors, flow sensors, fluid sensors, fluid velocity sensors, force sensors, gas sensors, glass sensors, global positioning system ("GPS") sensors, heat sensors, humidity sensors, imaging sensors, industrial sensors, infrared sensors, interface sensors, ionizing sensors, laser sensors, level sensors, light sensors, liquid sensors, magnetic sensors, manufacturing sensors, navigation sensors, optical sensors, pH sensors, photon sensors, polar sensors, position sensors, pressure sensors, proximity sensors, radar sensors, radiation sensors, radio sensors, shock sensors, smoke sensors, sound sensors, speed sensors, temperature sensors, thermal sensors, ultrasonic sensors, velocity sensors, vibration sensors, yaw sensors, any combinations thereof, and the like. Some examples disclosed herein focus on sensor types such as temperature and humidity sensors. It should be understood that these examples are merely exemplary and should not be construed as being limiting in any way.

Figure 10:
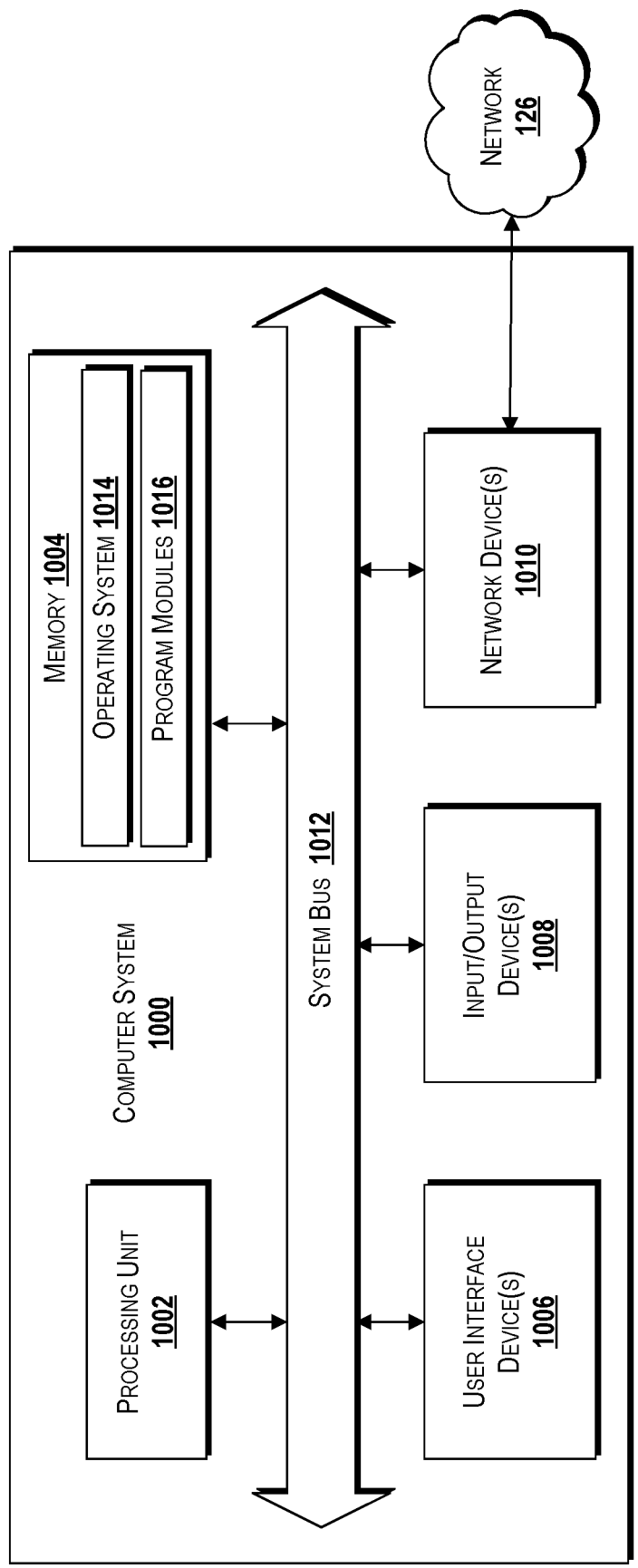
FIG. 10 is a block diagram illustrating an example computer system, according to an illustrative embodiment.

The controller 114 can control at least some of the functions of the device 104. The controller 114 can include one or more processors (an example of which is best shown in FIG. 10), which can be operatively linked and in communication with one or more memory components (also shown in FIG. 10). The processor(s) can execute computer-executable instructions stored in the memory component(s). Execution of the computer-executable instructions can cause the controller 114 to perform various functions described herein. In some embodiments, the controller 114 is designed as an integrated circuit, such as a microcontroller, system-on-a-chip, or the like, that includes the processor(s), memory component(s), and input/output components (e.g., the asset-to-device bus 106 and/or the device bus 112). In some embodiments, the network module 116 can be implemented as part of the controller 114. Those skilled in the art will appreciate the numerous designs suitable for the device 104 to effectively provide the functionality described herein. Although components of the device 104 are shown separately in the illustrated embodiment, integration of two or more of these components is contemplated and may be beneficial for some implementations. As such, the illustrated example and other examples described herein for the design of the device 104 should not be construed as being limiting in any way.

The device 104 can be associated with a device ID 132 (e.g., a device serial number) that uniquely identifies the device 104. In the illustrated example, the device ID 132 is shown as being stored in the controller 114 (e.g., in a memory component thereof). The device ID 132 may be stored elsewhere such as, for example, a dedicated memory component that may provide additional security to avoid spoofing or other tampering with the device 104. The device ID 132 can be provisioned into the device database 128 and stored as part of a registration process performed by the registration server 122 when the device 104 first connects to the registration server 122 via the network 126, or subsequent registration or re-registration as the case may be. The device ID 132 can be subsequently used, referenced, or queried to determine the identity of the device 104.

The network module 116 can be operatively linked and in communication with one or more communications networks such as the network 126. The network module 116 can be or can include a wireless network interface. The network module 116 can be used to communicate with other devices and/or networks (not shown). In some embodiments, the network module 116 includes or is otherwise in communication with a subscriber identity module ("SIM") system (not shown). The SIM system can include a universal SIM ("USIM"), a universal integrated circuit card ("UICC"), and/or other identity devices that can be uniquely identified by a SIM ICCID 134. The SIM system can include and/or can be connected to or inserted into an interface such as a slot interface. In some embodiments, the interface can be configured to accept insertion of other identity cards or modules for accessing various types of networks. Additionally, or alternatively, the interface can be configured to accept multiple subscriber identity cards. The network module 116 can be associated with its own unique identifier shown as a network module ID 136 (e.g., a network module serial number). The SIM ICCID 134 and the network module ID 136 can be associated with the device ID 132 in the device database 128. Because other devices and/or modules for identifying users, owners, and/or the device 104 are contemplated, it should be understood that these embodiments are illustrative, and should not be construed as being limiting in any way.

Figure 9:
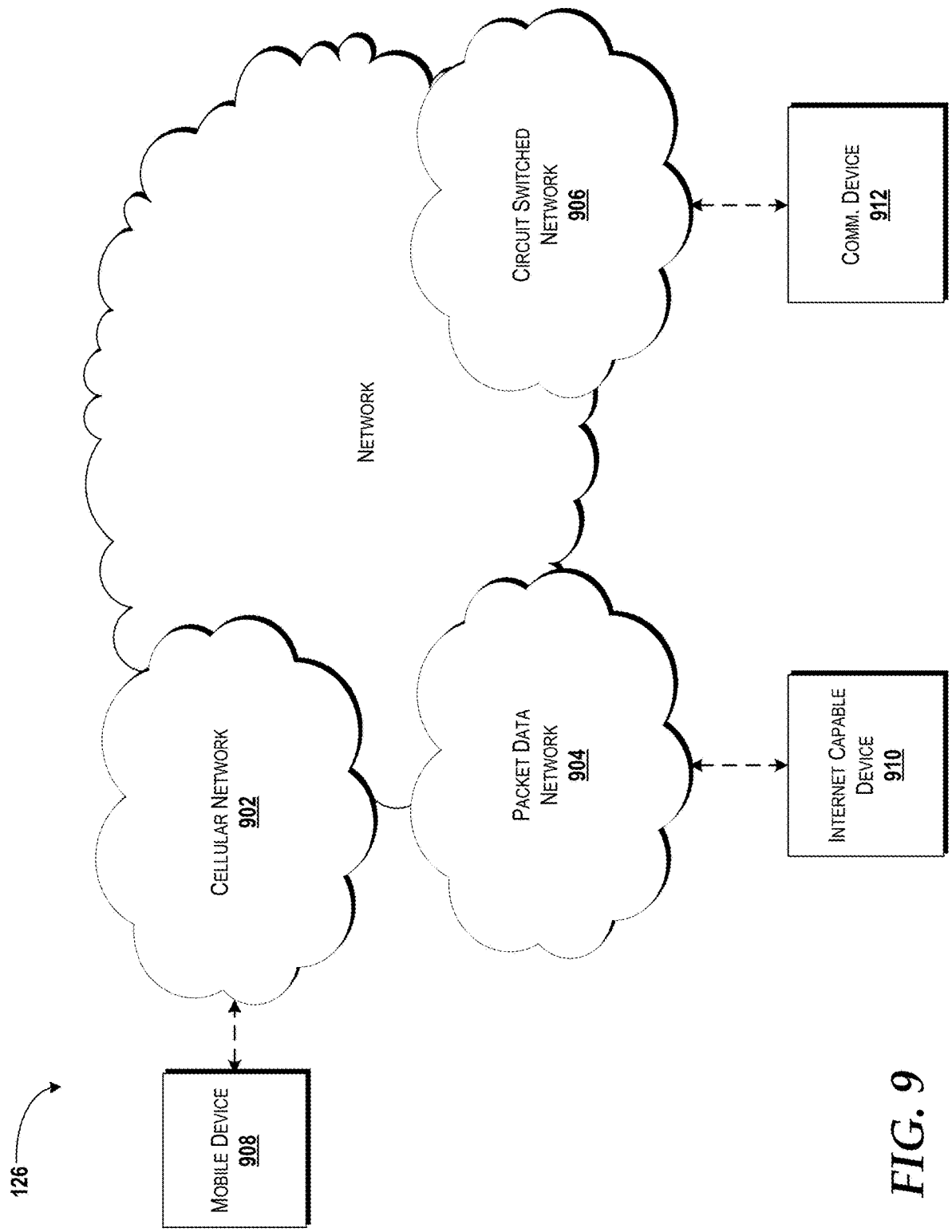
FIG. 9 is a block diagram illustrating a network, according to an illustrative embodiment.

The network 126 can be a single network or combination of multiple networks that utilize any wireless communications technology or combination of wireless communications technologies to provide wireless communications capabilities to the device 104. The network 126 may operate in accordance with one or more mobile telecommunications standards, including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), LTE-Advanced ("LTE-A"), Worldwide Interoperability for Microwave Access ("WiMAX"), other 802.XX technologies, and/or the like. Moreover, the network 126 can include one or more radio access networks ("RANs") (not shown) that provide an air interface over which the device 104 can communicate with the network 126. The RAN(s) may utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide the radio/air interface to devices. Data communications can be provided in part by the RAN(s) using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN(s) may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. In some embodiments, the network 126 is configured, at least in part, as shown in FIG. 9.

Turning now to FIG. 1B, the operating environment 100 is illustrated in a second configuration (shown as 100B). The operating environment 100B includes all components as illustrated and described above with reference to FIG. 1A. In addition, the device 104 has been modified with a device-side policy database (shown as "device policy DB") 138. Also, the registration server 122 has been modified with a server-side policy database (shown as "server policy DB") 140. The device policy database 138 and the server policy database 140 can store one or more policies, such as event-driven and operator-driven policies. The policies can provide dynamic rules to the device 104 to minimize system complexity and also to reduce data traffic between the device 104 and the network 126.

The device policy database 138 and the server policy database 140 can operate as independent databases that are implementation agnostic. For example, the server policy database 140 could be configured to utilize structured query language ("SQL"), and the device policy database 138 could be configured with an embedded lookup table. Device policies can be stored on the server policy database 140 so that an operator can view and query policies, edit and adjust policies, and generally "manage" the policies. Device policies also can be stored in the device policy database 138 to be used by the device 104 for execution purposes. The device 104 can use the device policy database 138 to execute the overall policy, trigger rules, etc. The policies stored in the device policy database 138 and the server policy database 140 are used to enforce the same rules/rulesets. As noted above, the implementation of each database, however, can be different. An example policy framework is described herein below with reference to FIG. 5.

Turning now to FIG. 1C, the operating environment 100 is illustrated in a third configuration (shown as 100C). The operating environment 100C includes all components as illustrated and described above with reference to FIG. 1A. In addition, the device 104 has been modified with a device-side ruleset database (shown as "device ruleset DB") 142. Also, the registration server 122 has been modified with a server-side ruleset database (shown as "server ruleset DB") 144. The device ruleset database 142 and the server ruleset database 144 can store one or more rulesets that allow for complex combinations of event/action management of functions provided by the device 104. Several example rulesets are described herein below with reference to FIG. 6. It should be understood that the operating environment in the second and third configuration (100B, 100C) are shown with separate policy and ruleset databases. These databases may be combined in some implementations. Alternatively, the policy and ruleset databases can be in communication such that the rules/rulesets referenced by a particular policy can be obtained from the ruleset database as needed.

Figure 2:
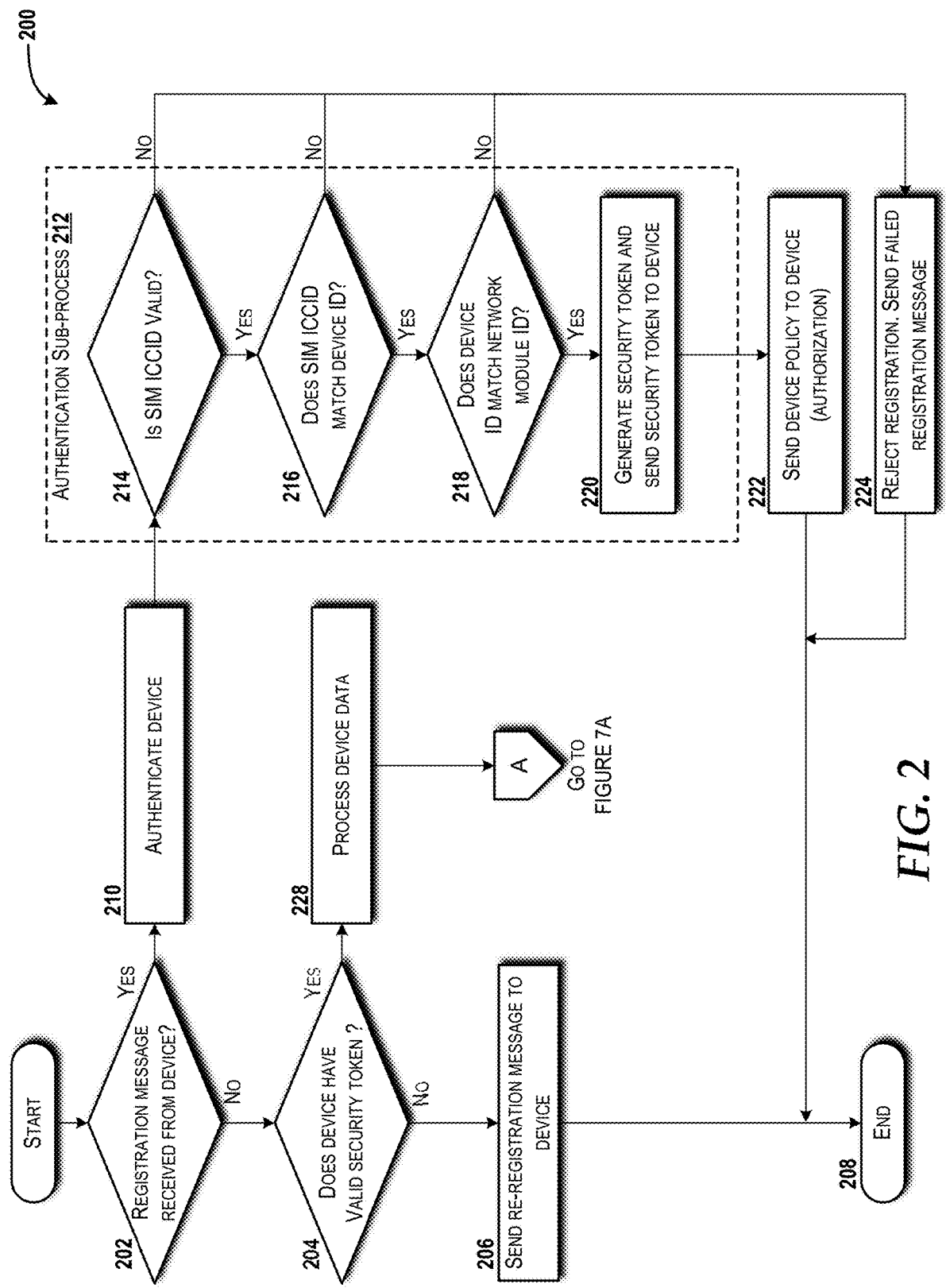
FIG. 2 is a flow diagram illustrating aspects of a method for a standalone device registration process with a device database, according to an illustrative embodiment.

Turning now to FIG. 2, a method 200 for a standalone device registration process, such as registering the device 104 with the registration server 122, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device to perform one or more operations, and/or causing the processor to direct other components of the computing system or device to perform one or more of the operations.

For purposes of illustrating and describing the concepts of the present disclosure, operations of the methods disclosed herein are described as being performed by the device 104, by the registration server 122, and/or by the analytics system 108. It should be understood that additional and/or alternative devices, servers, computers, and/or network nodes can provide the functionality described herein via execution of one or more modules, applications, and/or other software. Thus, the illustrated embodiments are illustrative, and should not be viewed as being limiting in any way.

As used herein, the concept of "registration" refers to a process of exchanging a set of messages (shown as messages 109 in FIGS. 1A-1C) between a device, such as the device 104, and a server, such as the registration server 122, to login. As used herein, the concept of "authentication" refers to a process of verifying the identity of a device, such as the device 104, that is attempting to login to a server, such as the registration server 122. As used herein, the concept of "authorization" refers to a process of granting a device, such as the device 104, access to functionality based upon one or more policies.

The method 200 will be described with reference to FIG. 2 and additional reference to FIG. 1A. The method 200 describes a device-only registration process. In other words, the method 200 describes a process of the device 104 "logging in" to the registration server 122. When the device 104 attempts to login for the first time, the device 104 undergoes an authentication process to verify its identity. After authentication, the device 104 obtains one or more security credentials, such as, in some embodiments, a software-based security token. When the device 104 attempts subsequent logins, the registration server 122 can check the validity of the security credential(s) prior to accepting a login request.

The method 200 begins and proceeds to operation 202. At operation 202, the registration server 122 can determine if a registration message (i.e., one of the messages 109) was received from the device 104. If the device 104 is a new device that needs to be registered with the registration server 122, the device 104 can generate a registration message and send the registration message to the registration server 122 to initiate a device registration process. The registration message can include a request to login/register with the registration server 122. In addition, the registration message can include the device ID 132, the SIM ICCID 134, and the network module ID 136 to be used in an authentication sub-process 212 described below. Alternatively, the device 104 may already be logged in/registered with the registration server 122, in which case the method 200 proceeds to operation 204.

At operation 204, the registration server 122 can determine if the device 104 has a valid security token or other security credential(s). The security token can be generated for the device 104 by the registration server 122 after authentication via the authentication sub-process 212. If, at operation 204, the registration server 122 determines that the device 104 does not have a valid security token, the method 200 proceeds to operation 206. The device 104 might not have a valid security token if, for example, the device 104 has not yet been authenticated; if, for example, the device 104 was authenticated but its security token has since expired; or if, for example, the security token is otherwise invalid. At operation 206, the registration server 122 can generate a re-registration message and send the re-registration message to the device 104. The method 200 then proceeds to operation 208, where the method 200 can end. In response to the re-registration message, the device 104 can generate and send a new registration message to the registration server 122 and the method 200 can restart at operation 202.

At operation 202, if a registration message (first registration or re-registration after authentication failure) is received from the device 104, the method 200 proceeds to operation 210. At operation 210, the registration server 122 can authenticate the device 104 as shown in the authentication sub-process 212. In particular, the registration server 122, at operation 214, can determine if the SIM ICCID 134 included in the registration message is valid for the device 104. SIM ICCID validation processes are well-known in the art, and therefore additional detail in this regard is not provided herein. Moreover, it should be understood that although a validation process using the SIM ICCID 134 is described, the concepts and technologies disclosed herein are not limited to (or dependent on) the SIM ICCID 134, and alternatively, the device 104 can be authenticated, at least in part, in accordance with other concepts (and other forms of identity verification) known to those skilled in the art.

If the registration server 122 determines, at operation 214, that the SIM ICCID 134 is valid, the method 200 proceeds to operation 216. At operation 216, the registration server 122 determines if the SIM ICCID 134 matches the device ID 132 also contained in the registration message. If the registration server 122 determines, at operation 216, that the SIM ICCID 134 matches the device ID 132, the method 200 proceeds to operation 218. At operation 218, the registration server 122 determines if the device ID 132 matches the network module ID 136 also contained in the registration message. If the registration server 122 determines, at operation 218, that the device ID 132 matches the network module ID 136, the method 200 proceeds to operation 220. At operation 220, the registration server 122 generates a security token and sends the security token to the device 104. The security token, in some embodiments, can be a software-based token. Those skilled in the art will appreciate the numerous ways a security token or other security credentials can be used to ensure the device 104 is the device it claims to be. As such, the examples provided herein are merely illustrative, and should not be construed as being limiting in any way.

From operation 220, the method 200 proceeds to operation 222. At operation 222, the registration server 122 can send one or more device policies to the device 104. A device policy can provide authorization for (i.e., allow) the device 104 to send IoT messages, as part of the messages 109, to the network 126. The device policy can specify the device sensors(s) 118 to be enabled; the frequency with which the device sensors(s) 118 record sensor data; the frequency with which the device 104 is to send recorded sensor data to the network 126; and/or other specifications that allow the device 104 to perform various operations. From operation 222, the method 200 proceeds to operation 208. The method 200 can end at operation 208.

If, at any check (operations 214, 216, and 218) during the authentication sub-process 212, the registration server 122 determines that the device 104 cannot be authenticated, the method 200 can proceed to operation 224. At operation 224, the registration server 122 can reject the registration request and send a registration failure message, as part of the messages 109, to the device 104. The registration failure message can notify the device 104 of the failed registration/authentication attempt. The method 200 then proceeds to operation 208. The method 200 can end at operation 208.

Figure 7A:
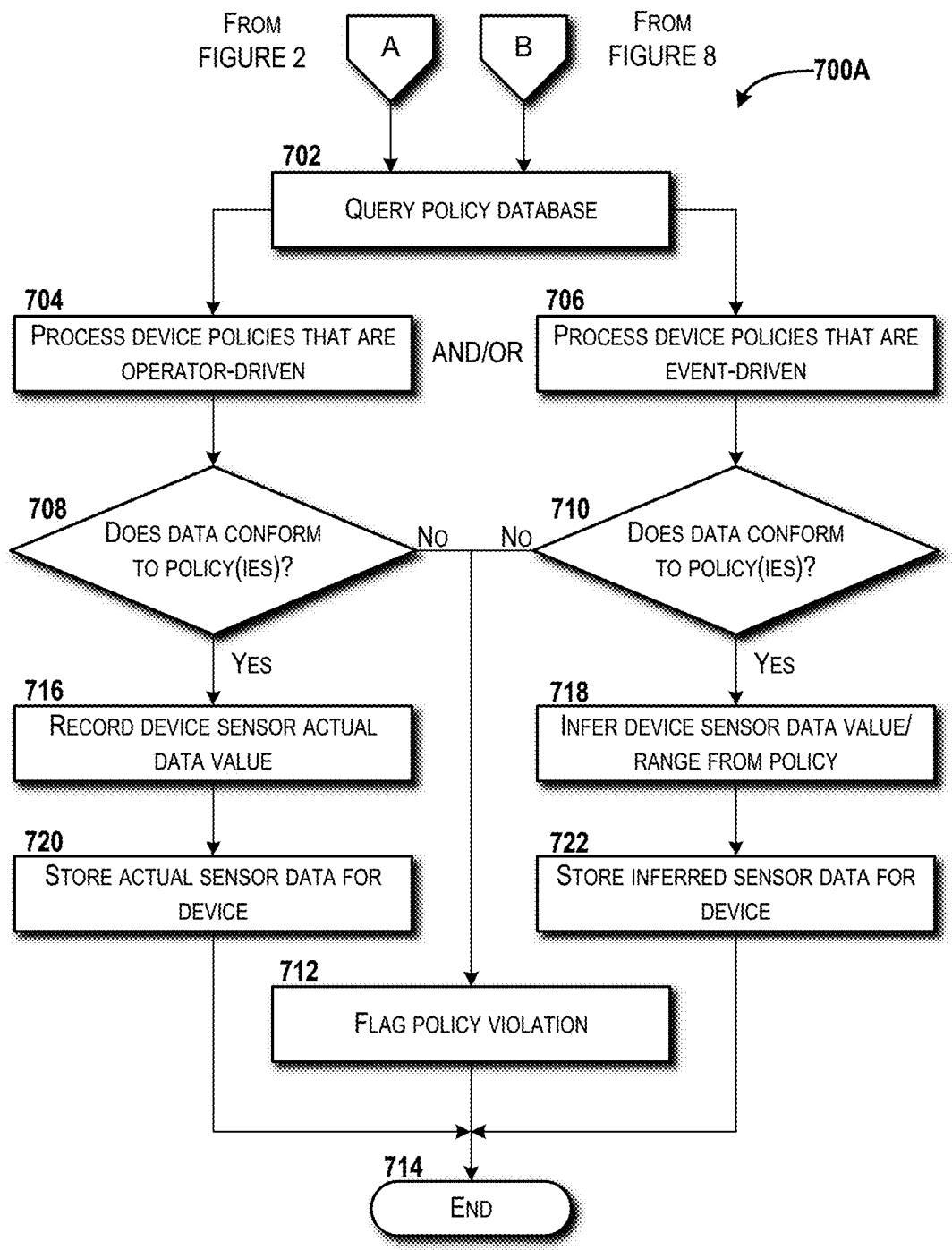
FIG. 7A is a flow diagram illustrating aspects of a method for implementing one or more policies for a device, according to an illustrative embodiment.

Turning back to operation 204, if the registration server 122 determines that the device has a valid security token (based upon a previous successful registration/authentication process), the method 200 proceeds to operation 228. At operation 228, the device 104 can process device data as best shown in FIG. 7A, which is described herein below.

Figure 3:
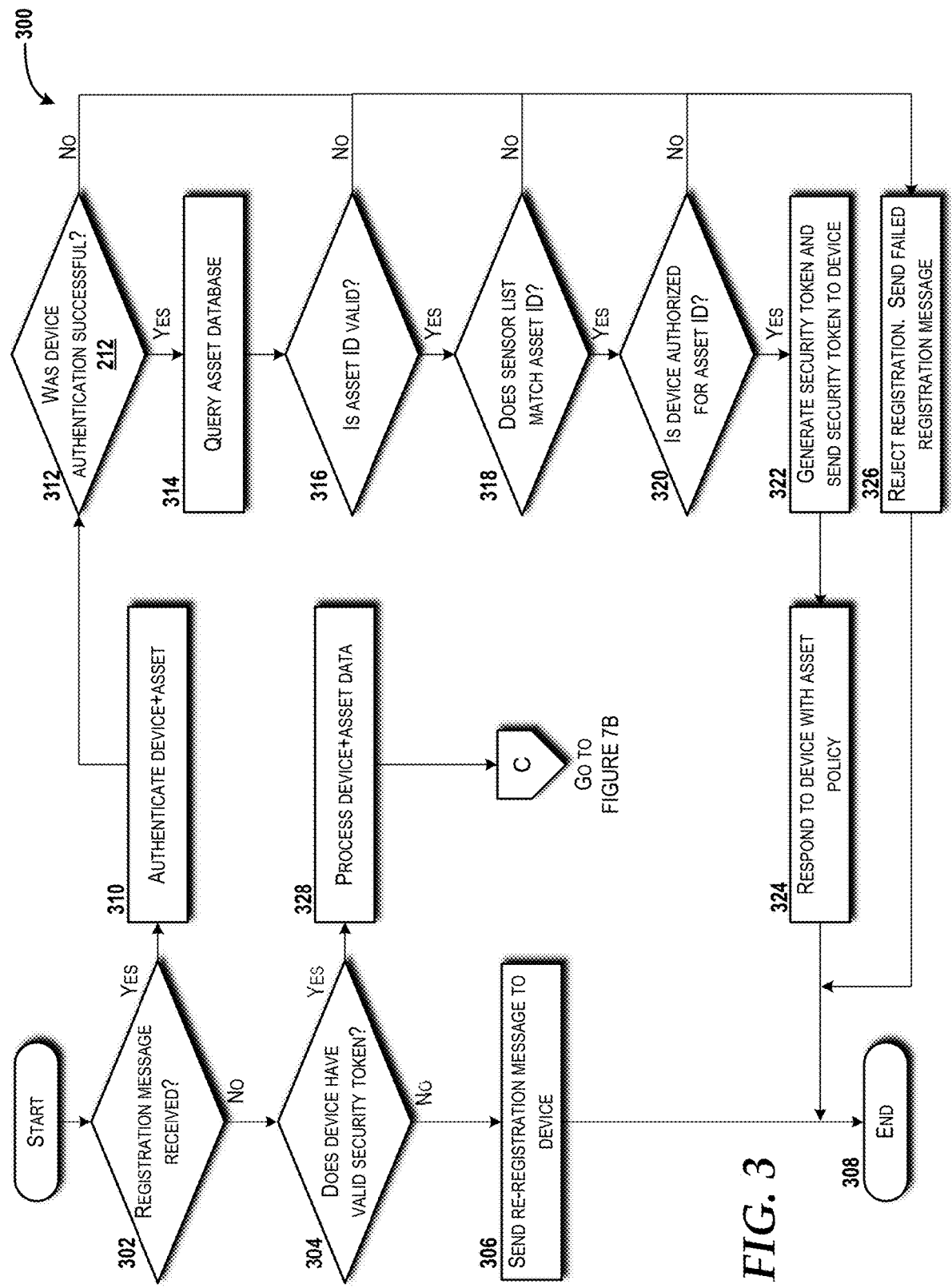
FIG. 3 is a flow diagram illustrating aspects of a method for a combined device and asset (device+asset) registration process with both a device database and an asset database, according to an illustrative embodiment.

Turning now to FIG. 3, a method 300 for a combined device and asset registration process will be described, according to an illustrative embodiment. As used herein, a "combined device and asset" encompasses the device 104 operatively connected and in communication with the asset 102 via the asset-to-device bus 106. The method 300 will be described with reference to FIG. 3 and additional reference to FIG. 1A. The method 300 describes a combined device and asset registration process. In other words, the method 300 describes a process of a combined device 104 and asset 102 "logging in" to the registration server 122. When the combined device 104 and asset 102 attempts to login for the first time, the combined device 104 and asset 102 undergoes an authentication process to verify its identity. After authentication, the combined device 104 and asset 102 obtains one or more security credentials, such as, in some embodiments, a software-based security token. When the combined device 104 and asset 102 attempts subsequent logins, the registration server 122 can check the validity of the security credential(s) prior to accepting a login request.

The method 300 begins and proceeds to operation 302. At operation 302, the registration server 122 can determine if a registration message (i.e., one of the messages 109) was received from the device 104. If the combined device 104 and asset 102 is a new combined device 104 and asset 102 (e.g., a new combination of the device 104 and one of the assets 102 that has not been registered) that needs to be registered with the registration server 122, the combined device 104 and asset 102 can generate a registration message and send the registration message to the registration server 122 to initiate a combined device and asset registration process. The registration message can include a request to login/register with the registration server 122. In addition, the registration message can include information about the device 104, including the device ID 132, the SIM ICCID 134, and the network module ID 136 to be used in an authentication sub-process 212 described above. The registration message can additionally include information about the asset 102, including the asset ID 120. Alternatively, the combined device 104 and asset 102 may already be logged in/registered with the registration server 122. In this case, the combined device 104 and asset 102 can instead request combined device 104 and asset 102 data to be processed, and the method 300 proceeds to operation 304 to check for a valid security token before data processing.

At operation 304, the registration server 122 can determine if the combined device 104 and asset 102 has a valid security token or other security credential(s). If, at operation 304, the registration server 122 determines that the combined device 104 and asset 102 does not have a valid security token, the method 300 proceeds to operation 306. The combined device 104 and asset 102 may not have a valid security token, for example: if the combined device 104 and asset 102 has not yet been authenticated; if the combined device 104 and asset 102 was authenticated but its security token has since expired; or if the security token is otherwise invalid. At operation 306, the registration server 122 can generate a re-registration message and send the re-registration message to the device 104. The method 300 then proceeds to operation 308, where the method 300 can end. In response to the re-registration message, the device 104 can generate and send a new registration message to the registration server 122 and the method 300 can restart at operation 302.

At operation 302, if a registration message is received from the combined device 104 and asset 102, the method 300 proceeds to operation 310. At operation 310, the registration server 122 can initiate authentication of the combined device 104 and asset 102. In particular, the method 300 can proceed to operation 312, where the registration server 122 can perform the authentication sub-process 212 described herein above with reference to operation 212 in FIG. 2. The registration server 122 can determine if the device authentication was successful. If so, the method 300 can proceed to operation 314.

At operation 314, the registration server 122 can query the asset database 127 for the asset ID 120 associated with the asset 102 in the combined device 104 and asset 102. From operation 314, the method 300 proceeds to operation 316, where the registration server 122 determines if the asset ID 120 is valid. For example, the asset database 127 may not have the asset ID 120 for the asset 102 in the combined device 104 and asset 102, or the asset ID 120 may be expired, compromised, or otherwise invalid. If the registration server 122 determines, at operation 316, that the asset ID 120 is valid, the method 300 proceeds to operation 318. At operation 318, the registration server 122 determines if the sensor list 130 matches the asset ID 120. If the registration server 122 determines, at operation 318, that the sensor list 130 matches the asset ID 120, the method 300 proceeds to operation 320. At operation 320, the registration server 122 determines if the device 104 is authorized for the asset 102 based upon the asset ID 120. The registration server 122 can determine if the device 104 is authorized for the asset 102 based upon a query to the server policy database 140. The server policy database 140 can store one or more policies that define to which asset(s) 102 the device 104 is authorized to be connected and in communication with.

If the registration server 122 determines, at operation 320, that the device 104 is authorized for the asset ID 120, the method 300 proceeds to operation 322, where the registration server 122 generates a security token for the combined device 104 and asset 102. The security token, in some embodiments, can be a software-based token. Those skilled in the art will appreciate the numerous ways a security token or other security credentials can be used to ensure the combined device 104 and asset 102 is the combined device 104 and asset 102 they claim to be. As such, the examples provided herein are merely illustrative, and should not be construed as being limiting in any way.

From operation 322, the method 300 proceeds to operation 324. At operation 324, the registration server 122 can send one or more asset policies to the device 104. An asset policy can provide authorization for (i.e., allow) the device 104 to send IoT messages associated with data obtained by the asset sensor(s) 110, as part of the messages 109, to the network 126. Other asset policies that allow the combined device 104 and asset 102 access to other functionality are contemplated. From operation 324, the method 300 proceeds to operation 308. The method 300 can end at operation 308.

If, at any check (operations 312, 316, 318, and 320), the registration server 122 determines that the device 104 cannot be authenticated, the method 300 can proceed to operation 326. At operation 326, the registration server 122 can reject the registration request and send a registration failure message, as part of the messages 109, to the combined device 104 and asset 102. The registration failure message can notify the combined device 104 and asset 102 of the failed registration/authentication attempt. The method 300 then proceeds to operation 308. The method 300 can end at operation 308.

Figure 7B:
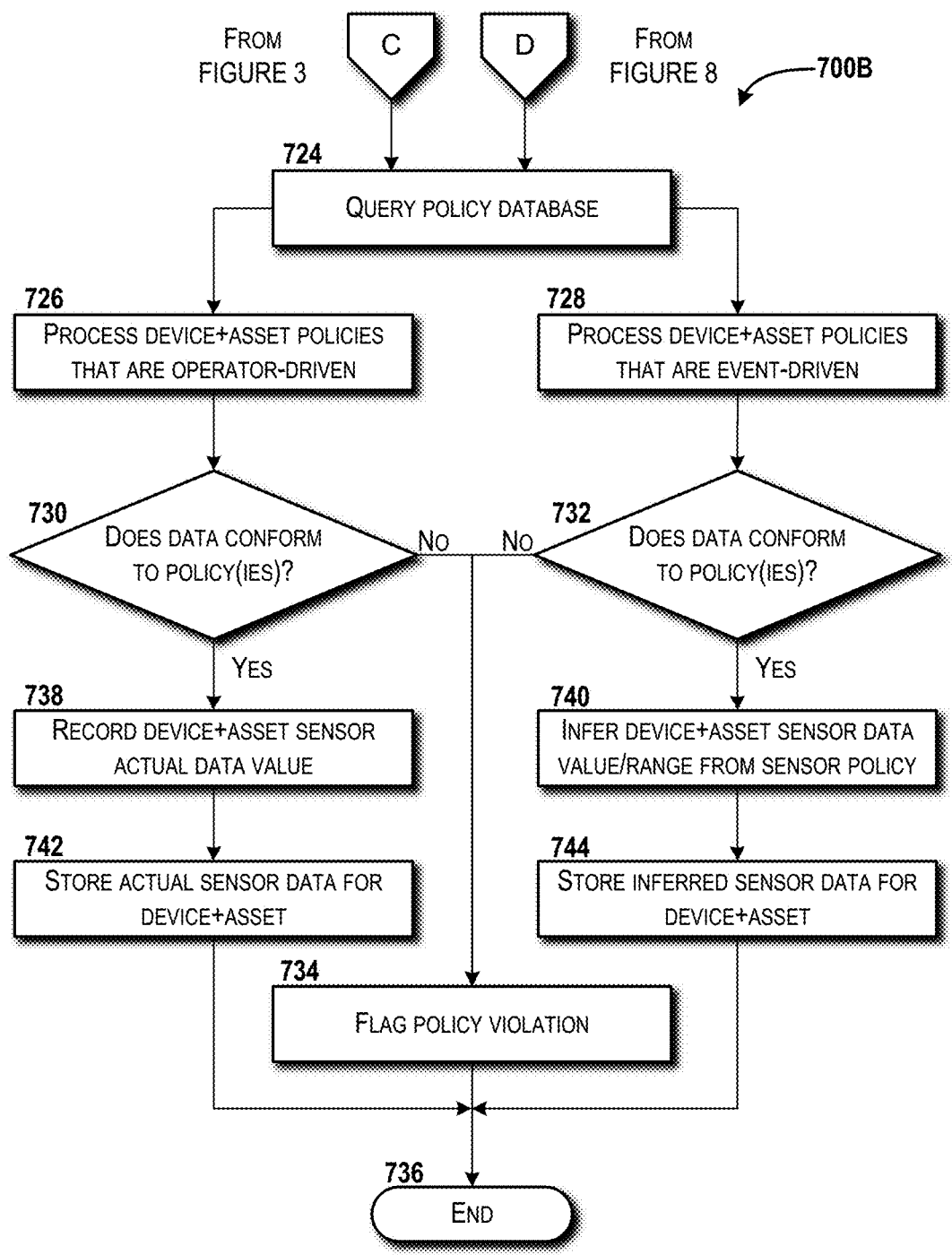
FIG. 7B is a flow diagram illustrating aspects of a method for implementing one or more policies for a combined device and asset, according to an illustrative embodiment.

Turning back to operation 304, if the registration server 122 determines that the device has a valid security token (based upon a previous successful registration/authentication process), the method 300 proceeds to operation 328. At operation 328, the combined device 104 and asset 102 can process combined device 104 and asset 102 data as best shown in FIG. 7B, which is described herein below.

Turning now to FIG. 4, a table diagram 400 illustrating different combinations of sensors 402 for different types of assets 102 will be described, according to an illustrative embodiment. The sensors 402 can include any combination of one or more asset sensors 111 and one or more device sensors 118. In the illustrated example, the sensors 402 include temperature and humidity sensors, door open/close sensors, motion and shock sensors, humidity sensors, chemical detection sensors, and pollutant sensors. The examples shown in FIG. 4 are merely exemplary of some of the combinations of sensors that can be used for different types of assets 102. Moreover, the illustrated example is focused on the asset 102 as a shipping container that contains different types of cargo, such as, for example, scrap cargo 404, general cargo 406, food cargo 408, flexitank cargo 410, and hazardous cargo 412. The asset 102 can be or can include other types of assets, such as those described herein above.

Turning briefly to FIG. 5, an example table diagram 500 illustrating aspects of a policy-based protocol for dynamic sensor combinations will be described, according to an illustrative embodiment. The policy-based protocol enables sensor flexibility to easily add new sensors, customize sensor capabilities, and add events and custom timers. The table diagram 500 illustrates a simplified structure of the policy-based protocol that includes columns for fields 502, tags 504, and values 506.

The first row of the fields 502 column includes a global device timer 508. The global device timer 508 maintains an auto-incrementing counter that continuously increments as the device 104 is in use. The global device timer 508 can be used as a reference for other timers, such as on-change timers, and can be refreshed as needed. The remaining fields 502 are dedicated to a plurality of sensors 510A-510N, which may include the asset sensors 111, the device sensors 118, or any combination thereof. Each of the sensors 510A-510N is associated with a sensor ID 512A-512N and a set of one or more sensors policies 514A-514N, respectively. For example, a first sensor 510A can be associated with a first sensor ID 512A and first sensor policies 514A. The first sensor policies 514A define rules for lower and upper thresholds, a sensor value (reading), an on-change trigger, an accuracy, and an on-change timer. Each of the fields 502 has a hexadecimal tag associated with it as shown in the tags 504 column and a value description in the values 506 column. As noted above, each rule can be associated with an identifier (e.g., a hexadecimal tag as shown). The example shown in FIG. 5 is merely exemplary and should not be construed as being limiting in any way.

Turning now to FIG. 6, a table diagram 600 illustrating aspects of example rulesets to be implemented as part of one or more policies is shown, according to an illustrative embodiment. The rulesets shown in FIG. 6 are examples of some possible rulesets that can be stored in the device ruleset database 142 and/or the server ruleset database 144 shown in FIG. 1C. Each example shown in the table diagram 600 includes a ruleset with rule type, rule name, rule value, and rule description fields. Example 1 shows a first ruleset for a temperature sensor with two rules. One rule (identified as Rule Type 0x03; Rule Name On-Change) states that if temperature changes, send a notification. Another rule (identified as Rule Type 0x05; Rule Name Accuracy) states that the sensor accuracy is 2 degrees Celsius. The first "temperature" ruleset is equal to rule 0x03 plus rule 0x05. In other words, the first ruleset is specific to a temperature sensor and is the combination of rules associated with that temperature sensor. A device policy is the combination of all sensor rulesets—for example, a temperature ruleset plus a humidity ruleset plus a door open/close ruleset, or other combination as the case may be.

The example described above is an example of an event-driven policy. Example 1 shows two rules in a temperature ruleset. If this is the only ruleset, then these two rules encompass the entirety of a device policy. The device policy is event-driven because an event, such as a change in temperature detected by a temperature sensor, causes the device 104 to send a notification to, for example, the analytics system 108. In other words, the device 104 will only send data when the policy (again the one ruleset in this example) is violated. A violation of this policy would be a temperature change (i.e., rule 0x03) that exceeds plus or minus 2 degrees Celsius (i.e., rule 0x05).

Example 2 in the table diagram 600 shows the addition of another rule (identified as Rule Type 0x06; Rule Name Timer). This rule enables a timer for an amount of time that the on-change event must remain true. The timer, in the illustrated example, is set to a Rule Value of 60 seconds. As such, a violation of a policy that contains this ruleset would be a temperature change (i.e., rule 0x03) that exceeds plus or minus 2 degrees Celsius (i.e., rule 0x05) for a duration of more than 60 seconds.

Example 3 in the table diagram 600 removes the On-Change rule and adds a lower threshold rule (identified as Rule Type 0x01; Rule Name Lower Threshold) and an upper threshold rule (identified as Rule Type 0x02; Rule Name Upper Threshold). In addition, the timer is set to 30 seconds. This example rule states that a reading taken by the temperature sensor is lower than 5 degrees Celsius (i.e., rule 0x01) plus or minus 1 degree Celsius (i.e., rule 0x05), or is higher than 40 degrees Celsius (i.e., rule 0x02) plus or minus 1 degree Celsius (i.e., rule 0x05), for more than 30 seconds (i.e., rule 0x06), then a notification can be sent to, for example, the analytics system 108.

Example 4 introduces a refresh timer sensor and a cell-ID sensor. The refresh timer sensor utilizes the timer rule (identified as Rule Type 0x06; Rule Name Timer) to refresh the global timer (shown in FIG. 5) every 60 seconds in the illustrated example. The cell-ID sensor can include an on-change rule (identified as Rule Type 0x04; Rule Name On-Change) and another timer rule (identified as Rule Type 0x07; Rule Name On-Change-Timer ("OCT") 1) set such that on-change the global timer is ignored and a query is sent to the NM 116 every 15 seconds and reports whenever there is a cell-ID change.

Figure 8:
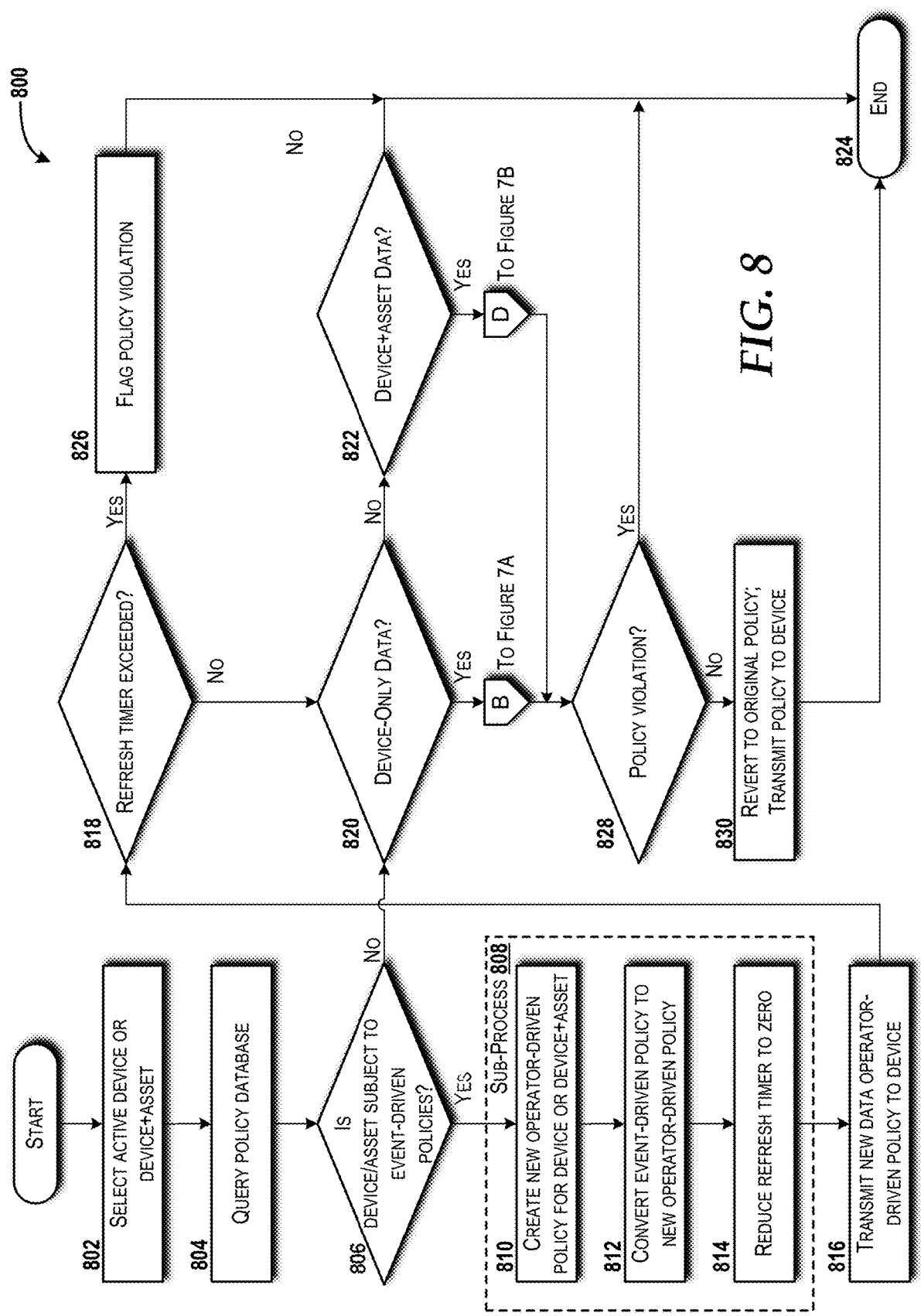
FIG. 8 is a flow diagram illustrating aspects of a method for intelligently verifying event-based policies, according to an illustrative embodiment.

Turning now to FIG. 7A, a flow diagram illustrating aspects of a method 700A for implementing one or more policies for a device 104 will be described, according to an illustrative embodiment. The method 700A begins from either FIG. 2 or FIG. 8. In particular, the method 700A may begin from operation 228 of FIG. 2. Alternatively, the method 700A may begin from operation 820 of FIG. 8. FIG. 8 will be described in detail herein below. From either operation 228 of FIG. 2 or operation 820 of FIG. 8, the method 700A proceeds to operation 702. At operation 702, the analytics system 108 queries the device policy database 138 for one or more device policies. A policy, as explained in more detail above, can be operator-driven or event-driven. In the example described above (i.e., Example 1 in FIG. 6), the policy is event-driven, and in particular, states that if the temperature value changes by plus or minus 2 degrees Celsius, then the policy is violated, and the analytics system 108 identifies and flags the policy violation.

From operation 702, the method 700A proceeds to operation 704 or 706. Continuing the above example, the method 700A would proceed to operation 706 and process the event-driven policy. If one or more operator-driven policies are found, the method 700A can alternatively proceed to operation 704. For instances in which both one or more operator-driven policies and one or more event-driven policies are found, the method 700A can process, serially, the operator-driven policy(ies) then the event-driven policy(ies), or vice versa. Parallel processing of the operator-driven policy(ies) and the event-driven policy(ies) is also contemplated.

From operation 704, the method 700A proceeds to operation 708, and similarly, from operation 706, the method 700A proceeds to operation 710. At both operation 708 and operation 710, the analytics system 108 determines if data received from one or more of the device sensors 118 conforms to the operator-driven and/or event-driven policies as the case may be. If, at either operation 708 or operation 710, the analytics system 108 determines that the data does not conform to the respective policy(ies), the method 700A proceeds to operation 712. At operation 712, the analytics system 108 can identify and flag a policy violation. For example, if the policy contains a temperature ruleset that states if temperature is less than 2 degrees or if the temperature is more than 5 degrees (i.e., a range 2>t<5), then send a data message containing the current temperature value to the analytics system 108. If the actual temperature reading is 4 degrees Celsius, then the reading would violate the policy—that is, the temperature reading is not less than 2 degrees or more than 5 degrees. The method 700A, accordingly, would proceed to operation 712. From operation 712, the method 700A proceeds to operation 714. The method 700A can end at operation 714.

Instead, if the data received is a heartbeat message with no temperature data, then this is not considered to be a violation of the aforementioned example policy. In other words, the data conforms to the policy, and the method 700A proceeds to operation 718. At operation 718, the analytics system 108 can infer the temperature based upon the temperature rule. In this example, the temperature is inferred to be greater than 2 degrees Celsius and less than 5 degrees Celsius (i.e., a range 2<t<5). From operation 718, the method 700A proceeds to operation 722. At operation 722, the analytics system 108 can store the inferred sensor data in association with the device 104. The method 700A can then proceed to operation 714, where the method 700A can end.

For an operator-driven policy, if the data conforms to the policy as determined at operation 708, the method 700A can proceed to operation 716. At operation 716, the analytics system 108 can record the actual data value. At operation 720, the analytics system 108 can store the actual data in association with the device 104. The method 700A can then proceed to operation 714, where the method 700 can end.

Turning now to FIG. 7B, a flow diagram illustrating aspects of a method 700B for implementing one or more policies for a combined device 104 and asset 102 (i.e., device+asset 104/102) will be described, according to an illustrative embodiment. The method 700B begins from either FIG. 3 or FIG. 8. In particular, the method 700B may begin from operation 328 of FIG. 3. Alternatively, the method 700B may begin from operation 822 of FIG. 8. FIG. 8 will be described in detail herein below. From either operation 328 of FIG. 3 or operation 822 of FIG. 8, the method 700B proceeds to operation 724. At operation 724, the analytics system 108 queries the device policy database 138 for one or more asset policies. It should be noted that for device+asset 104/102 combinations, the policy(ies) that affect the asset 102 are given priority. A policy, as explained in more detail above, can be operator-driven or event-driven. In the example described above (i.e., Example 1 in FIG. 6), the policy is event-driven, and in particular, states that if the temperature value changes by plus or minus 2 degrees Celsius, then the policy is violated, and the analytics 104 can identify and flag the policy violation From operation 724, the method 700B proceeds to operation 726 or 728. Continuing the above example, the method 700B would proceed to operation 728 and process the event-driven policy. If one or more operator-driven policies are found, the method 700B can alternatively proceed to operation 726. For instances in which both one or more operator-driven policies and one or more event-driven policies are found, the method 700B can process, serially, the operator-driven policy(ies) then the event-driven policy(ies), or vice versa. Parallel processing of the operator-driven policy(ies) and the event-driven policy(ies) is also contemplated.

From operation 726, the method 700B proceeds to operation 730, and similarly, from operation 728, the method 700 proceeds to operation 732. At both operation 730 and operation 732, the analytics system 108 determines if data received from one or more of the asset sensors 111 and/or one or more of the device sensors 118 conforms to the operator-driven and/or event-driven policies as the case may be. If, at either operation 726 or operation 728, the analytics system 108 determines that the data does not conform to the respective policy(ies), the method 700B proceeds to operation 734. At operation 734, the analytics system 108 can identify and flag a policy violation. For example, if the policy contains a temperature ruleset that states if temperature is less than 2 degrees or if the temperature is more than 5 degrees, then send a data message containing the current temperature value to the analytics system 108. If the actual temperature reading is 4 degrees Celsius, then the reading would violate the policy—that is, the temperature reading is not less than 2 degrees or more than 5 degrees. The method 700B, accordingly, would proceed to operation 734. From operation 734, the method 700B proceeds to operation 736. The method 700B can end at operation 736.

Instead, if the data received is a heartbeat message with no temperature data, then this is not considered to be a violation of the aforementioned example policy. In other words, the data conforms to the policy, and the method 700B proceeds to operation 740. At operation 740, the analytics system 108 can infer the temperature based upon the temperature rule. In this example, the temperature is inferred to be greater than 2 degrees Celsius and less than 5 degrees Celsius (i.e., a range 2<t<5). From operation 740, the method 700B proceeds to operation 744. At operation 744, the analytics system 108 can store the inferred sensor data in association with the device+asset 104/102. The method 700B can then proceed to operation 736, where the method 700B can end.

For an operator-driven policy, if the data conforms to the policy as determined at operation 730, the method 700B can proceed to operation 738. At operation 738, the analytics system 108 can record the actual data value. At operation 742, the analytics system 108 can store the actual data in association with the device+asset 104/102. The method 700B can then proceed to operation 714, where the method 700 can end.

Turning now to FIG. 8, a flow diagram illustrating aspects of a method 800 for intelligently verifying event-based policies will be described, according to an illustrative embodiment. FIG. 8 shows how an operator can interactively verify individual devices, such as the device 104, by changing an event-driven policy to an operator-driven policy to verify that one or more sensors are working. The method 800 will be described from the perspective of the analytics system 108 through which an operator can monitor/track devices 104 or device+asset 104/102 combinations. It should be understood that device verification and monitoring/tracking processes can be conducted automatically on behalf of the operator.

The method 800 begins and proceeds to operation 802, where the analytics system 108 selects an active device or device+asset 104/102. In some embodiments, analytics system 108 presents a graphical user interface ("GUI") or other interface through which an operator, or an entity working on behalf of the operator, can view any number of active standalone devices 104 and/or device+asset 104/102 combinations. From operation 802, the method 800 proceeds to operation 804, where the analytics system 108 can query the server policy database 140 for any policies applicable to the selected device 104 or device+asset 104/102. From operation 804, the method 800 proceeds to operation 806, where the analytics system 108 determines if the device/asset is subject to event-driven policy(ies). If, at operation 806, the analytics system 108 determines that the device/asset 104/102 is subject to one or more event-driven policies, the method 800 proceeds to sub-process 808.

The sub-process 808 begins at operation 810, where a new operator-driven policy is generated for the device 104 or the asset 102. From operation 810, the method 800 proceeds to operation 812, where the event-driven policy is converted to the new operator-driven policy. Continuing the temperature example from above, the event-driven policy is to send a notification to the analytics system 108 if the temperature value changes by plus or minus 2 degrees Celsius. This event-driven policy can be converted into an operator-driven policy, such as "send temperature."

From operation 812, the method 800 proceeds to operation 814, where the refresh timer is reduced to zero. From operation 814, the method 800 proceeds to operation 816, where the new operator-driven policy is transmitted to the device 104. From operation 816, the method 800 proceeds to operation 818, where the device 104 determines if the refresh timer has been exceeded. If the refresh timer has not been exceeded, the method 800 continues to operation 820.

At operation 820, the analytics system 108 determines if device-only 104 data exists based upon one or more of the messages 109 (i.e., sensor data messages) received from the device 104. If so, the method proceeds to FIG. 7A as described above. If not, the method 800 proceeds from operation 820 to operation 822. At operation 822, the analytics system 108 determines if device+asset 104/102 data exists. If so, the method 800 proceeds to FIG. 7B as described above. If not, the method 800 proceeds to operation 824. The method 800 can end at operation 824.

Turning back to operation 818, if it is determined that the refresh timer has been exceeded, the method 800 proceeds to operation 826, where a policy violation can be flagged/recorded. The method 800 then proceeds to operation 824. The method 800 can end at operation 824.

Turning back to operation 820, if the analytics system 108 determines that a message from the device 104 contains device-only data, the method 800 proceeds to FIG. 7A as described above. Alternatively, at operation 822, if the analytics system 108 determines that a message from the device 104 contains device+asset 104/102 data, the method 800 proceeds to operation FIG. 7B as described above. From FIG. 7A or FIG. 7B, if a policy violation is flagged, the method 800 can end at operation 824. If no policy violation, the method 800 can proceed to operation 830, where the device reverts back to the original policy. From operation 830, the method 800 proceeds to operation 824. The method 800 can end at operation 824.

In the temperature example, suppose one month has elapsed and the analytics system never receives a temperature reading, and instead, only receives heartbeat messages. This can be an indication that the temperature as measured by a temperature sensor of the device 104 or the device+asset, as the case may be, has remained between 2 and 5 degrees Celsius. The temperature sensor, however, might be broken, or might have encountered an error of some sort such as a bug. Under these circumstances, the operator might want to see whether the device 104 or device+asset 104/102 is working properly. Accordingly, as described in the sub-process 808 above, a new operator-driven policy can be created and the existing event-driven policy (for temperature) can be converted into an operator-driven policy that simply requests a temperature output. When the temperature is received from the device 104, now suppose the temperature is 4 degrees Celsius. This means that the device 104 is working properly. If, instead, the temperature is 7 degrees Celsius, it is likely there is something wrong with the device 104 or the associated temperature sensor. This is because the event-driven policy should have forced the device 104 to report the temperature outside of the 2<t<5 degrees Celsius range.

Turning now to FIG. 9, additional details of an embodiment of the network 126 are illustrated, according to an illustrative embodiment. The network 126 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, and combinations thereof, can be operatively connected to the cellular network 902. The device 104 also can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards as well as evolved and future mobile standards.

The packet data network 904 includes various devices, for example, servers, computers, databases, and other devices in communication with one another, as is generally known. The device 104 can be part of or in communication with the packet data network 904. The registration server 122, the analytics system 108, and/or other servers/system not shown can be in communication with the packet data network 904. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet.

The circuit switched network 906 includes various hardware and software for providing circuit switched communications. The circuit switched network 906 may include, or may be, what is often referred to as a plain old telephone system ("POTS"). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 908, for example, the device 104, a personal computer ("PC"), a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910.

Turning now to FIG. 10, a block diagram illustrating a computer system 1000 configured to provide the functionality described herein in accordance with various embodiments of the concepts and technologies disclosed herein. In some embodiments, one or more elements of the network 126, the analytics system 108, and/or the registration server 122 can be configured like and/or can have an architecture similar or identical to the computer system 1000 described herein with respect to FIG. 10. It should be understood, however, that any of these systems, devices, or elements may or may not include the functionality described herein with reference to FIG. 10.

The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the computer system 1000.

The memory 1004 communicates with the processing unit 1002 via the system bus 1012. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 1016 may include various software and/or program modules described herein. By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium," "computer-readable storage medium," and variations thereof does not include waves or signals per se and/or communication media.

The user interface devices 1006 may include one or more devices with which a user accesses the computer system 1000. The user interface devices 1006 may include, but are not limited to, computers, servers, personal digital assistants, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer to output data.

The network devices 1010 enable the computer system 1000 to communicate with other networks or remote systems via one or more networks, such as the network 126. Examples of the network devices 1010 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network(s) may be a wired network such as, but not limited to, a WAN such as the Internet, a LAN, a wired PAN, or a wired MAN.

Figure 11:
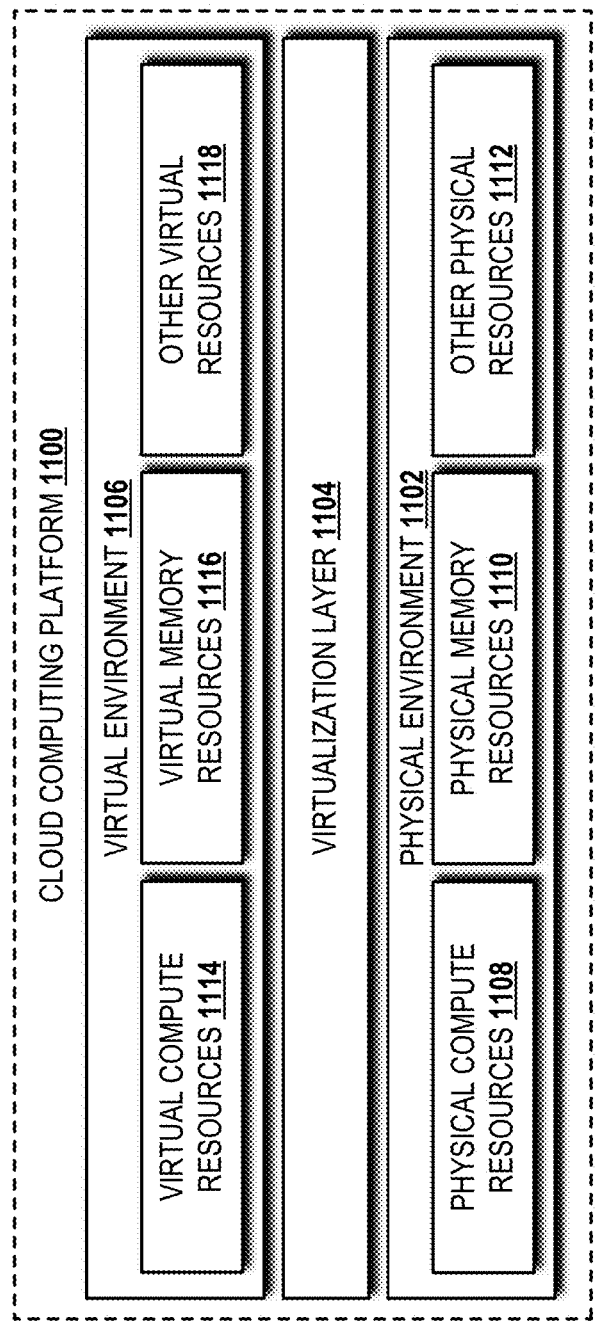
FIG. 11 is a block diagram illustrating an example cloud computing platform, according to an illustrative embodiment.

Turning now to FIG. 11, an illustrative cloud computing platform 1100 will be described, according to an illustrative embodiment. The network 126, the registration server 122, the analytics system 108, the device 104, the asset 102, and/or other networks, systems, and/or devices disclosed herein can be implemented and/or controlled, at least in part, in/by the cloud environment 1100.

The cloud computing platform 1100 includes a physical environment 1102, a virtualization layer 1104, and a virtual environment 1106. While no connections are shown in FIG. 11, it should be understood that some, none, or all of the components illustrated in FIG. 11 can be configured to interact with one other to carry out various functions described herein. In some embodiments, the components are arranged so as to communicate via one or more networks. Thus, it should be understood that FIG. 11 and the remaining description are intended to provide a general understanding of a suitable environment in which various aspects of the embodiments described herein can be implemented, and should not be construed as being limiting in any way.

The physical environment 1102 provides hardware resources that, in the illustrated embodiment, include one or more physical compute resources 1108, one or more physical memory resources 1110, and one or more other physical resources 1112.

The physical compute resource(s) 1108 can include one or more hardware components that perform computations to process data and/or to execute computer-executable instructions of one or more application programs, one or more operating systems, and/or other software. The physical compute resources 1108 can include one or more central processing units ("CPUs") configured with one or more processing cores. The physical compute resources 1108 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 1108 can include one or more discrete GPUs. In some other embodiments, the physical compute resources 1108 can include CPU and GPU components that are configured in accordance with a co-processing CPU/GPU computing model, wherein the sequential part of an application executes on the CPU and the computationally-intensive part is accelerated by the GPU processing capabilities. The physical compute resources 1108 can include one or more system-on-chip ("SoC") components along with one or more other components, including, for example, one or more of the physical memory resources 1110, and/or one or more of the other physical resources 1112. In some embodiments, the physical compute resources 1108 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 1108 can be or can include one or more hardware components architected in accordance with an ARM architecture, available for license from ARM HOLDINGS of Cambridge, United Kingdom. Alternatively, the physical compute resources 1108 can be or can include one or more hardware components architected in accordance with an x86 architecture, such an architecture available from INTEL CORPORATION of Mountain View, Calif., and others. Those skilled in the art will appreciate the implementation of the physical compute resources 1108 can utilize various computation architectures, and as such, the physical compute resources 1108 should not be construed as being limited to any particular computation architecture or combination of computation architectures, including those explicitly disclosed herein.

The physical memory resource(s) 1110 can include one or more hardware components that perform storage/memory operations, including temporary or permanent storage operations. In some embodiments, the physical memory resource(s) 1110 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 1108.

The other physical resource(s) 1112 can include any other hardware resources that can be utilized by the physical compute resources(s) 1108 and/or the physical memory resource(s) 1110 to perform operations described herein. The other physical resource(s) 1112 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 1102 can be virtualized by one or more virtual machine monitors (not shown; also known as "hypervisors") operating within the virtualization/control layer 1104 to create virtual resources that reside in the virtual environment 1106. The virtual machine monitors can be or can include software, firmware, and/or hardware that alone or in combination with other software, firmware, and/or hardware, creates and manages virtual resources operating within the virtual environment 1106.

The virtual resources operating within the virtual environment 1106 can include abstractions of at least a portion of the physical compute resources 1108, the physical memory resources 1110, and/or the other physical resources 1112, or any combination thereof, shown as virtual compute resources 1114, virtual memory resources 1116, and other virtual resources 1118, respectively. In some embodiments, the abstractions can include one or more virtual machines upon which one or more applications can be executed.

Based on the foregoing, it should be appreciated that aspects for an apparatus for policy-based programmable IoT devices have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. An apparatus comprising:
   an Internet of Things ("IoT") device comprising
   a device bus through which the IoT device is to be connected to an asset, wherein the asset comprises an asset sensor that monitors a parameter of the asset, wherein the asset and the asset sensor of the asset are external to the IoT device, and wherein the device bus is configured to cause the IoT device to view the asset sensor of the asset as an internal sensor of the IoT device,
   a device sensor,
   a network module, and
   a controller that executes instructions that cause the IoT device to perform operations comprising
      receiving an event-driven device policy that instructs the IoT device to collect device data from the device sensor and to send the device data to an analytics system in accordance with a device ruleset, wherein the device ruleset instructs the IoT device to send a data message including the device data only when the device data violates the device ruleset of the event-driven device policy,
      collecting, from the device sensor, the device data in accordance with the device ruleset,
      determining whether the device data conforms to the device ruleset of the event-driven device policy,
      in response to determining that the device data violates the device ruleset of the event-driven device policy, providing a data message to the analytics system that includes the device data collected from the device sensor,
      in response to determining that the device data conforms to the device ruleset of the event-driven device policy, providing a data message to the analytics system that does not include the device data collected from the device sensor, wherein the device data can be determined by the analytics system based on the data message not including the device data collected from the device sensor,
      receiving an operator-driven device policy that instructs the IoT device to collect device data from the device sensor and to send the device data regardless of whether the device data conforms to the device ruleset of the event-driven device policy, and
      in response to receiving the operator-driven device policy,
         converting the event-driven device policy to the operator-driven device policy, and
         sending a data message to the analytics system including the device data collected from the device sensor.

2. The apparatus of claim 1, wherein the IoT device is uniquely identified by a device identifier, and wherein the operations further comprise registering the IoT device with a registration server using at least the device identifier.

3. The apparatus of claim 2, further comprising the asset, wherein the asset comprises a sensor hub that is uniquely identified by an asset identifier, and wherein the operations further comprise registering a combination of the IoT device and the asset with the registration server using at least the device identifier and the asset identifier.

4. The apparatus of claim 3, wherein the operations further comprise:
receiving an asset policy that instructs the IoT device to collect asset data from the asset sensor in accordance with an asset ruleset; and
collecting, from the asset sensor, the asset data in accordance with the asset ruleset.

5. The apparatus of claim 4, further comprising the analytics system, wherein the operations further comprise:
providing, by the IoT device, the asset data to the analytics system; and
determining, by the analytics system, whether the asset data conforms to the asset policy.

6. The apparatus of claim 5, wherein, in response to determining that the device data does not conform to the device ruleset of the event-driven device policy, flagging, by the analytics system, a device policy violation of the event-driven device policy, and wherein, in response to determining that the asset data does not conform to the asset policy, flagging, by the analytics system, an asset policy violation of the asset policy.

7. The apparatus of claim 5, wherein in response to determining that the asset data does conform to the asset policy, recording the asset data.

8. The apparatus of claim 7, wherein the asset policy comprises an operator-driven asset policy or an event-driven asset policy, wherein, when the asset policy comprises the operator-driven asset policy, recording the asset data comprises recording an actual asset data value, and wherein, when the asset policy comprises the event-driven asset policy, recording the asset data comprises recording an inferred asset data value.

9. A method comprising:
receiving, via a network module of an Internet of Things ("IoT") device, an event-driven device policy that instructs the IoT device to collect device data from a device sensor and to send the device data to an analytics system in accordance with a device ruleset, wherein the device ruleset instructs the IoT device to send a data message including the device data only when the device data violates the device ruleset of the device policy, wherein the IoT device comprises a device bus through which the IoT device is to be connected to an asset, wherein the asset comprises an asset sensor that monitors a parameter of the asset, wherein the asset and the asset sensor of the asset are external to the IoT device, wherein the device bus is configured to cause the IoT device to view the asset sensor as an internal sensor of the IoT device, and wherein the IoT device further comprises the device sensor, the network module, and a controller;
collecting, by the controller, from the device sensor, the device data in accordance with the device ruleset;
determining, by the controller, whether the device data conforms to the device ruleset of the event-driven device policy;
in response to determining that the device data violates the device ruleset of the event-driven device policy, providing, by the controller, a data message to the analytics system that includes the device data collected from the device sensor;
in response to determining that the device data conforms to the device ruleset of the event-driven device policy, providing, by the controller, a data message to the analytics system that does not include the device data collected from the device sensor, wherein the device data can be determined by the analytics system based on the data message not including the device data collected from the device sensor;
receiving, by the controller, an operator-driven device policy that instructs the IoT device to collect device data from the device sensor and to send the device data regardless of whether the device data conforms to the device ruleset of the event-driven device policy; and
in response to receiving the operator-driven device policy, converting, by the controller, the event-driven device policy to the operator-driven device policy, and sending, by the controller, a data message to the analytics system including the device data collected from the device sensor.

10. The method of claim 9, wherein the IoT device is uniquely identified by a device identifier, and wherein the method further comprises registering the IoT device with a registration server using at least the device identifier.

11. The method of claim 10, wherein the asset comprises a sensor hub that is uniquely identified by an asset identifier, and wherein the method further comprises registering a combination of the IoT device and the asset with the registration server using at least the device identifier and the asset identifier.

12. The method of claim 11, further comprising:
receiving, via the network module of the IoT device, an asset policy that instructs the IoT device to collect asset data from the asset sensor in accordance with an asset ruleset; and
collecting, from the asset sensor, the asset data in accordance with the asset ruleset.

13. The method of claim 12, wherein the IoT device is part of an apparatus, wherein the apparatus further comprises the analytics system, and wherein the method further comprises:
providing, by the IoT device, the asset data to the analytics system; and
determining, by the analytics system, whether the asset data conforms to the asset policy.

14. The method of claim 13, wherein, in response to determining that the device data does not conform to the device ruleset of the event-driven device policy, flagging, by the analytics system, a device policy violation of the event-driven device policy, and wherein, in response to determining that the asset data does not conform to the asset policy, flagging, by the analytics system, an asset policy violation of the asset policy.

15. The method of claim 13, wherein, in response to determining that the asset data does conform to the asset policy, recording the asset data.

16. The method of claim 15, wherein the asset policy comprises an operator-driven asset policy or an event-driven asset policy, and wherein:
when the asset policy comprises the operator-driven asset policy, recording the asset data comprises recording an actual asset data value; and when the asset policy comprises the event-driven asset policy, recording the asset data comprises recording an inferred asset data value.

17. A computer-readable storage medium storing instructions that, when executed by a controller of an Internet of Things ("IoT") device comprising a device sensor, a network module, and a device bus through which the IoT device is to be connected to an asset comprising an asset sensor that monitors a parameter of the asset and that is external to the IoT device and is viewed, based on the device bus, by the IoT device as an internal sensor, cause the controller to perform operations comprising:

receiving an event-driven device policy that instructs the IoT device to collect device data from the device sensor and to send the device data to an analytics system in accordance with a device ruleset, wherein the device ruleset instructs the IoT device to send a data message including the device data only when the device data violates the device ruleset of the event-driven device policy;

collecting, from the device sensor, the device data in accordance with the device ruleset;

determining whether the device data conforms to the device ruleset of the event-driven device policy;

in response to determining that the device data violates the device ruleset of the event-driven device policy, providing a data message to the analytics system that includes the device data collected from the device sensor, in response to determining that the device data conforms to the device ruleset of the event-driven device policy, providing a data message to the analytics system that does not include the device data collected from the device sensor, wherein the device data can be determined by the analytics system based on the data message not including the device data collected from the device sensor;

receiving an operator-driven policy that instructs the IoT device to collect device data from the device sensor and to send the device data regardless of whether the device data conforms to the device ruleset of the event-driven device policy; and in response to receiving the operator-driven policy,
converting the event-driven device policy to the operator-driven policy, and
sending a data message to the analytics system including the device data collected from the device sensor.

18. The computer-readable storage medium of claim 17, wherein the IoT device is uniquely identified by a device identifier, and wherein the operations further comprise registering the IoT device with a registration server using at least the device identifier.

* * * * *